United States Patent
Ochiai et al.

(10) Patent No.: US 7,593,078 B2
(45) Date of Patent: Sep. 22, 2009

(54) TRANSFLECTIVE LIQUID CRYSTAL DISPLAY DEVICE HAVING LIQUID CRYSTAL LAYER IN THE REFLECTIVE PORTION THICKER THAN IN THE TRANSMISSIVE PORTION

(75) Inventors: Takahiro Ochiai, Chiba (JP); Toshio Miyazawa, Chiba (JP); Masahiro Maki, Mobara (JP); Tohru Sasaki, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 189 days.

(21) Appl. No.: 11/772,275

(22) Filed: Jul. 2, 2007

(65) Prior Publication Data

US 2008/0013022 A1    Jan. 17, 2008

(30) Foreign Application Priority Data

Jul. 13, 2006    (JP) .............................. 2006-192384

(51) Int. Cl.
 *G02F 1/1335*    (2006.01)
 *G02F 1/1343*    (2006.01)

(52) U.S. Cl. ....................................... 349/114; 349/141

(58) Field of Classification Search ................. 349/114, 349/141
See application file for complete search history.

(56) References Cited

U.S. PATENT DOCUMENTS

| 2007/0002226 A1 | 1/2007 | Sakamoto et al. |
| 2007/0103626 A1 | 5/2007 | Morimoto et al. |
| 2007/0177078 A1* | 8/2007 | Liu et al. ..................... 349/114 |
| 2007/0273813 A1* | 11/2007 | Yoshida et al. .............. 349/113 |

FOREIGN PATENT DOCUMENTS

| JP | 2003-207795 | 7/2003 |
| JP | 2005-322049 | 11/2005 |
| JP | 2007-041572 | 2/2007 |
| JP | 2007-127933 | 5/2007 |

* cited by examiner

*Primary Examiner*—Andrew Schechter
*Assistant Examiner*—Dennis Y Kim
(74) *Attorney, Agent, or Firm*—Antonelli, Terry, Stout & Kraus, LLP.

(57) ABSTRACT

There is disclosed a transflective liquid crystal display device having reflective portions having an improved contrast ratio. At each subpixel of the display device, a pixel electrode is shared between transmissive and reflective portions. Independent counter electrodes are used respectively for the transmissive and reflective portions. Different potentials are applied to the counter electrodes for the transmissive and reflective portions. The transmissive portion operates in normally black mode. That is, the transmissive portion displays black when no voltage is applied. The reflective portion operates in normally white mode. That is, the reflective portion displays white when no voltage is applied. The liquid crystal layer in the reflective portion is thicker than the liquid crystal layer in the transmissive portion.

12 Claims, 19 Drawing Sheets

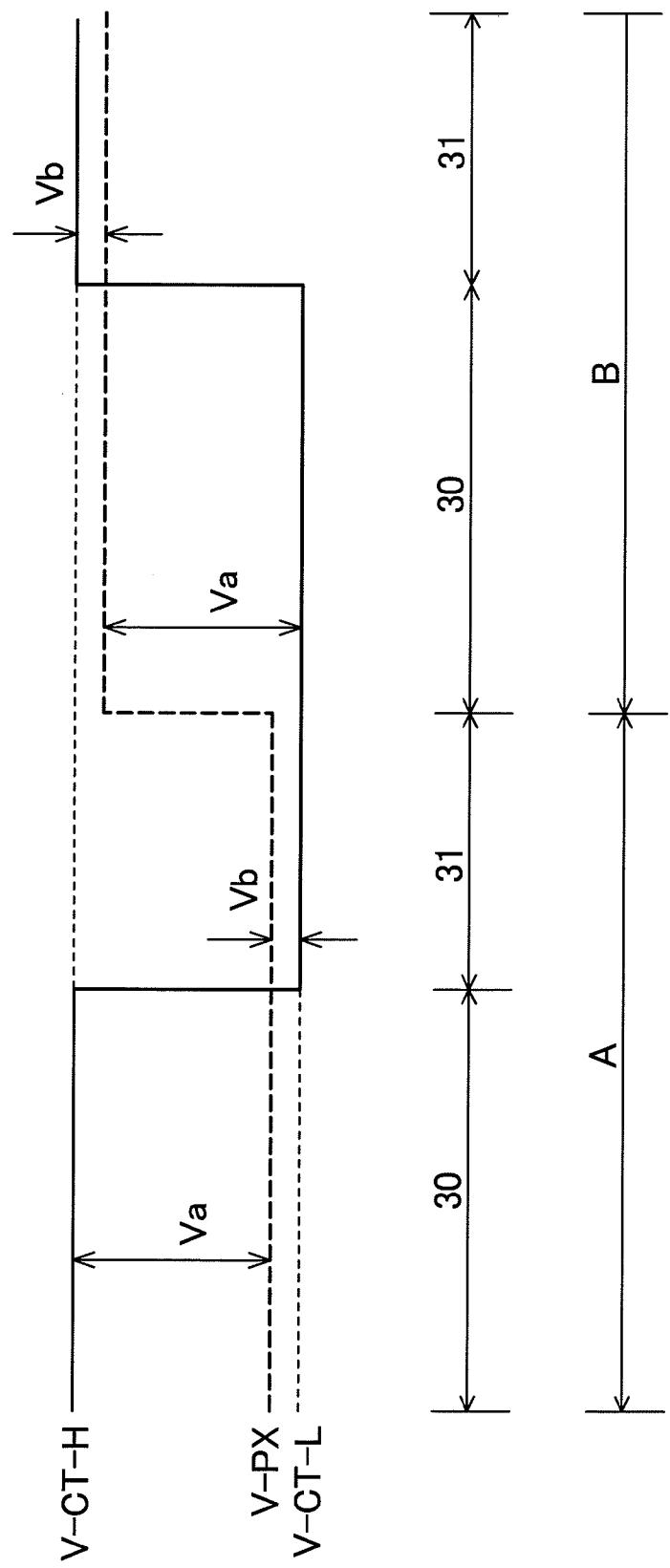

TRANSFLECTIVE LIQUID CRYSTAL DISPLAY DEVICE HAVING LIQUID CRYSTAL LAYER IN THE REFLECTIVE PORTION THICKER THAN IN THE TRANSMISSIVE PORTION

The present application claims priority from Japanese application JP2006-192384 filed on Jul. 13, 2006, the content of which is hereby incorporated by reference into this application.

BACKGROUND OF THE INVENTION

The present invention relates to a transflective liquid crystal display device (LCD) and, more particularly, to an IPS transflective LCD.

Transflective LCDs having subpixels each including transmissive and reflective portions are used as display units for mobile devices.

In such a transflective LCD, a liquid crystal material is sandwiched between a pair of plates or substrates. An electric field is applied in a direction perpendicular to the plane of the substrates to drive the liquid crystal material. This is known as the vertical field type. Furthermore, steps are formed on the transmissive and reflective portions to match the transmissive and reflective portions with respect to characteristics. In addition, retardation film is formed between the polarizer and the liquid crystal layer.

An IPS liquid crystal display device is one of known liquid crystal display devices. In such an IPS LCD, pixel electrodes (PIX) and a counter electrode (CT) are formed on the same substrate. An electric field is produced by the pixel electrodes and the counter electrode. Brightness/darkness levels are controlled by rotating the liquid crystal material within the plane of the substrates. Therefore, the IPS LCD has the feature that when the viewing screen is viewed obliquely, the shades of gray of the displayed image are not inverted.

In an attempt to make effective use of this feature, fabricating a transflective LCD using the IPS LCD has been proposed, for example, in patent reference 1 below.

However, where a transflective liquid crystal display is built using the IPS LCD, there is the following problem. If a retardation film is not used, and if each transmissive portion operates in normally black mode, for example, each reflective portion operates in normally white mode. Consequently, bright and dark parts of image are inverted between the transmissive and reflective portions.

Accordingly, in an attempt to solve the foregoing problem, the present applicant has filed a patent application for a transflective liquid crystal display device having a novel pixel structure (see patent reference 2 below).

In this transflective LCD already filed for a patent, the transmissive portions operate in normally black mode. That is, when no voltage is applied, the transmissive portions display black. The reflective portions operate in normally white mode. That is, when no voltage is applied, the reflective portions display white.

In this transflective LCD already filed for a patent, the pixel structure of each subpixel is so designed that the transmissive and reflective portions use respective independent counter electrodes but use a common pixel electrode. Different reference voltages (counter voltages or common voltages) are applied to the counter electrodes, thus preventing inversion of bright and dark parts of image between the transmissive and reflective portions.

Prior art literature associated with the present invention includes the following references.

Patent reference 1 described below states, "light passes through the liquid crystal layer twice in the region A that is a light reflective part. On the other hand, light passes through the region B once, the region B being a light transmissive portion. This produces a difference in optical transmissivity. To avoid problems due to the transmissivity difference, the region B is operated in first-order birefringent mode. The region A is operated in second-order birefringent mode."Furthermore, the reference states, "display on each of the regions can be optimized by making the liquid crystal layer in the region A using the second-order birefringent mode about three times as thick as, i.e., from about 2.5 times to 3.5 times, the liquid crystal layer in the region B using the first-order birefringent mode."

[Patent reference 1] JP-A-2003-207795
[Patent reference 2] Japanese Patent Application No. 2005-322049

SUMMARY OF THE INVENTION

As described previously, in the transflective LCD already filed for a patent, the reflective portions operate in normally white mode and so in order to display black, the liquid crystal material must be driven by applying a voltage to the liquid crystal material. Consequently, it is difficult to achieve complete black. Therefore, the luminance obtained when black is displayed tends to be higher than in normally black mode. It can be considered that the contrast ratio of the reflective portions decreases.

The present invention has been made to solve the foregoing problems with the related art. It is an object of the present invention to provide a technique of capable of improving the contrast ratio of the reflective portions of an IPS transflective liquid crystal display device, the reflective portions operating in normally white mode.

The foregoing and other objects of the present invention and features thereof will become apparent from the following description and accompanying drawings.

(1) A first embodiment of the present invention provides a transflective liquid crystal display device including a liquid crystal display (LCD) panel having a pair of substrates and a liquid crystal layer sandwiched between the substrates. The LCD panel has plural subpixels each having a transmissive portion and a reflective portion. Each of the subpixels has a pixel electrode and counter electrodes formed on one of the substrates. The pixel electrode and the counter electrodes produce an electric field to drive the liquid crystal layer. At each of the subpixels, the pixel electrode is shared between the transmissive and reflective portions. The counter electrode of the transmissive portion is independent of the counter electrode of the reflective portion. Different potentials are applied to the counter electrodes of the transmissive and reflective portions, respectively. The transmissive portion operates in normally black mode. That is, when no voltage is applied, the transmissive portion displays black. The reflective portion operates in normally white mode. That is, when no voltage is applied, the reflective portion displays white. The liquid crystal layer in the reflective portion is thicker than the liquid crystal layer in the transmissive portion.

(2) A second embodiment of the invention is based on the transflective liquid crystal display device of the first embodiment (1) above and further characterized in that a step formation layer is formed on or in the transmissive portion.

(3) A third embodiment of the invention is based on the first embodiment (1) or second embodiment (2) above and further characterized in that no retardation film is formed on or in the reflective portion.

(4) A fourth embodiment of the invention is based on any one of the first through third embodiments (1)-(3) and further characterized in that the liquid crystal layer is made of a negative liquid crystal material.

(5) A fifth embodiment of the invention is based on any one of the first through third embodiments (1)-(3) and further characterized in that the liquid crystal layer is made of a positive liquid crystal material.

(6) A sixth embodiment of the invention is based on any one of the first through fifth embodiments (1)-(5) and further characterized in that a first polarizer is placed on one of the substrates, while a second polarizer is placed on the other substrate. The axes of polarization of the first and second polarizers are perpendicular to each other. The initial orientation axis of the liquid crystal material in the liquid crystal layer is coincident with the axis of polarization of one of the first and second polarizers.

(7) A seventh embodiment of the invention is based on any one of the first through sixth embodiments (1)-(6) and further characterized in that within each of the subpixels, the potential applied to the counter electrode of one of the transmissive and reflective portions is higher than the potential applied to the pixel electrode. The potential applied to the counter electrode of the other of the transmissive and reflective portions is lower than the potential applied to the pixel electrode.

(8) An eighth embodiment of the invention is based on any one of the first through seventh embodiments (1)-(7) and further characterized in that when two adjacent display lines are taken as one display line and the other display line, respectively, the counter electrode of the reflective portion at each of the subpixels on the one display line and the counter electrode of the transmissive portion at each of the subpixels on the other display line are a common electrode.

(9) A ninth embodiment of the invention is based on any one of the first through eighth embodiments (1)-(8) and further characterized in that each of the counter electrodes is a planar electrode and that an interlayer dielectric film is formed on the planar counter electrodes. The pixel electrode is formed on the interlayer dielectric film.

(10) A tenth embodiment of the invention is based on any one of the first through eighth embodiments (1)-(8) and further characterized in that each of the pixel electrodes is a planar electrode and that an interlayer dielectric film is formed on the planar pixel electrodes. The counter electrodes are formed on the interlayer dielectric film.

(11) An eleventh embodiment of the invention is based on any one of the first through tenth embodiments (1)-(10) and further characterized in that a relationship given by $1.3 \leq dr/dt \leq 2$ is satisfied, where dr is the thickness of the liquid crystal layer in the reflective portion and dt is the thickness of the liquid crystal layer in the transmissive portion.

(12) A twelfth embodiment of the invention is based on the eleventh embodiment (11) and further characterized in that a relationship given by $1.5 \leq dr/dt \leq 1.6$ is satisfied, where dr is the thickness of the liquid crystal layer in the reflective portion and dt is the thickness of the liquid crystal layer in the transmissive portion.

Advantages produced by typical embodiments of the present invention disclosed herein are described briefly below.

According to the present invention, in an IPS transflective liquid crystal display device where reflective portions operate in normally white mode, the contrast ratio of the reflective portions can be improved.

BRIEF DESCRIPTION OF THE DRAWINGS

FIG. 1-2 is a view of only pixel electrodes, counter electrodes, and reflective electrodes extracted from the device shown in FIG. 1-1.

FIG. 2 is a cross-sectional view of main portions, showing the cross-sectional structure along line A-A' of FIG. 1-1.

FIG. 23 is a diagram showing reference voltages applied to the counter electrode of each transmissive portion and to the counter electrode of each reflective portion of the transflective liquid crystal display device of FIG. 22 on which the present invention is based.

DESCRIPTION OF THE PREFERRED EMBODIMENTS

Figure 1:
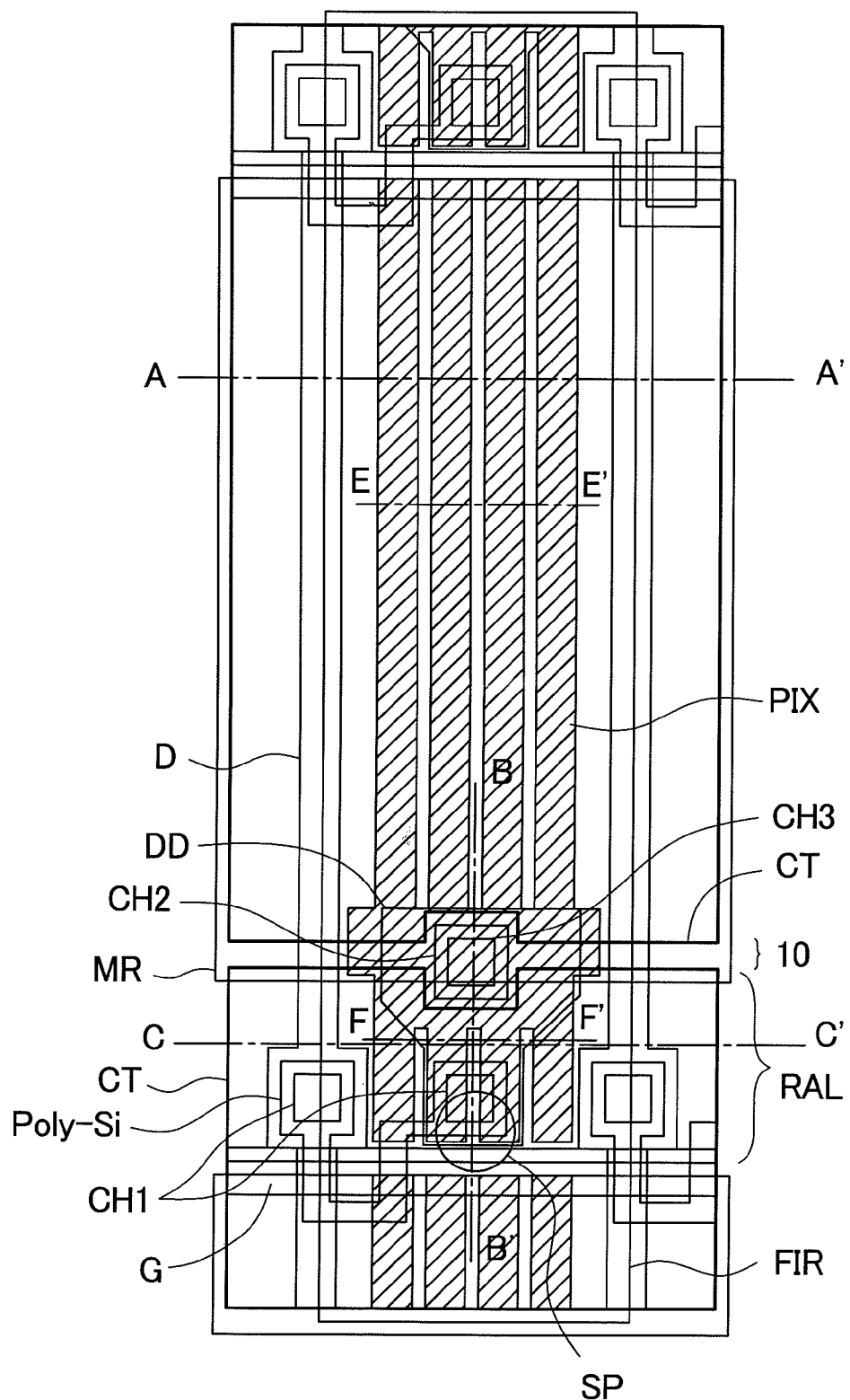
FIG. 1-1 is a plan view of a transflective liquid crystal display device of Embodiment 1 of the present invention, showing the subpixel electrode structure.

Embodiments of the present invention are hereinafter described in detail with reference to the drawings.

It is to be noted that those components having identical functions are indicated by identical reference numerals through all the figures illustrating the embodiments and that repeated description of those components is omitted.

[Transflective Liquid Crystal Display Device on Which the Present Invention is Based]

Figure 22:
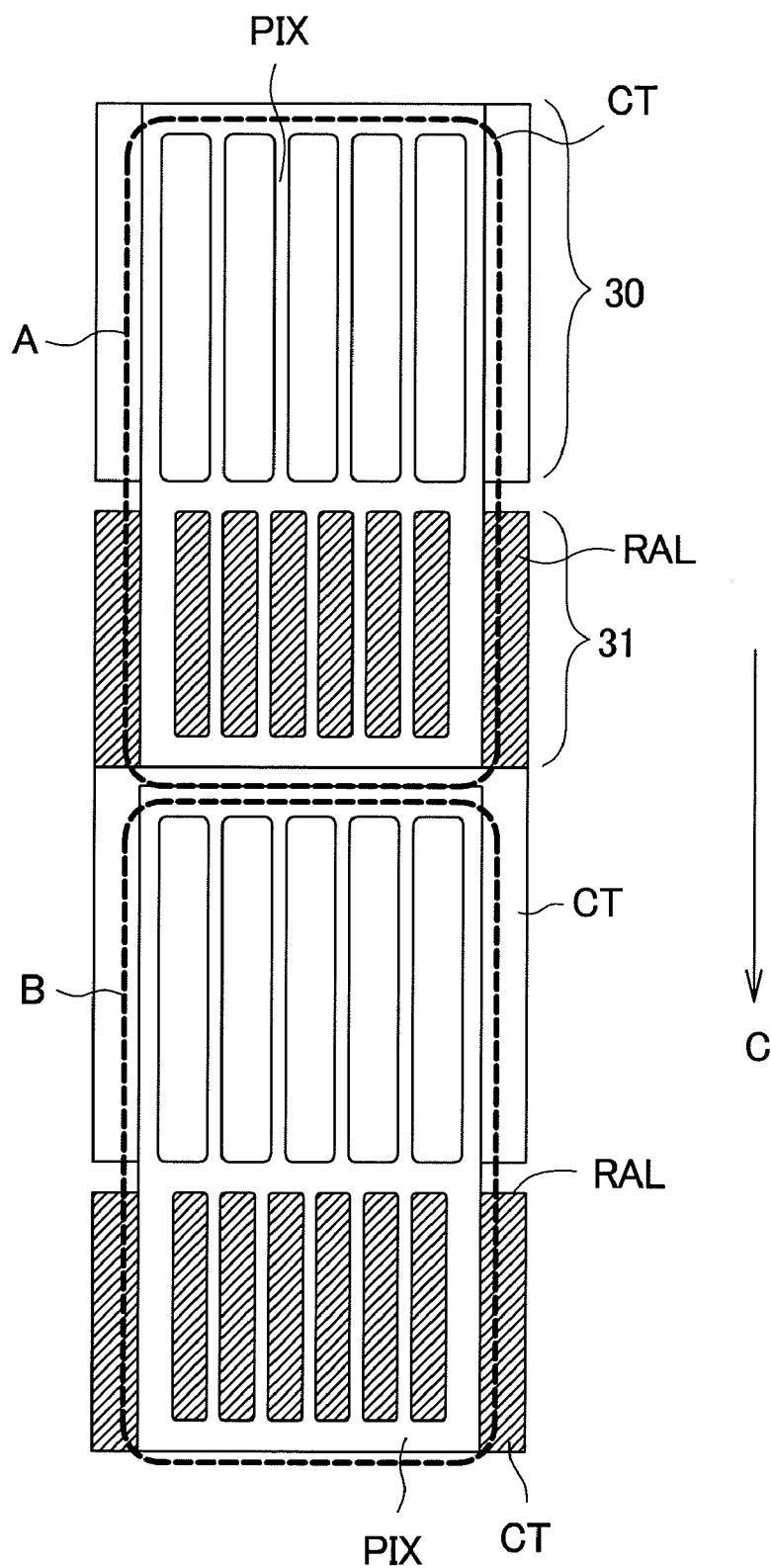
FIG. 22 is a plan view of a transflective liquid crystal display device on which the present invention is based, showing the subpixel electrode structure.

FIGS. 22 and 23 are a view and a diagram associated with a transflective liquid crystal display device on which the present invention is based. FIG. 22 is a plan view showing the subpixel electrode structure. FIG. 23 is a diagram showing reference voltages applied respectively to the counter electrodes of transmissive portions and the counter electrodes of reflective portions. The transmissive portions 30 operate in normally white mode. The reflective portions 31 operate in normally black mode.

In FIG. 22, the transmissive portions 30 form a transmissive liquid crystal display panel. The reflective portions 31 form a reflective liquid crystal display panel.

Within each one subpixel, a pixel electrode (PIX) is used commonly. However, counter electrodes (CT) for the transmissive portions 30 and reflective portions 31, respectively, are independent of each other. That is, there are two separate counter electrodes (CT) for the transmissive and reflective portions. A reflective electrode (RAL) is formed on the counter electrode (CT) of the reflective portions 31.

In FIG. 22, the counter electrode (CT) of the reflective portion 31 on one of two adjacent display lines which has a subpixel A in FIG. 22 and the counter electrode (CT) of the transmissive portion 30 on the other display line having a subpixel B in FIG. 22 are fabricated from a common electrode. The direction of scanning is indicated by the arrow C in FIG. 22.

As shown in FIG. 23, different reference voltages are applied to the counterelectrode (CT) of the transmissive portion 30 and to the counter electrode (CT) of the reflective portion 31 within each one subpixel.

For example, at the subpixel A in FIG. 22, a reference voltage (V-CT-H) at a high level (H level) is applied to the counter electrode (CT) of the transmissive portion 30. A reference voltage (V-CT-L) at a low level (L level) is applied to the counter electrode (CT) of the reflective portion 31.

At the subpixel A in FIG. 22, a video voltage (V-PX) is applied to the pixel electrode (PIX). The video voltage is of negative polarity when viewed from the transmissive portion 30. The video voltage is of positive polarity when viewed from the reflective portion 31. The negative polarity referred to herein means that the potential at the pixel electrode (PIX) is lower than the potential at the counter electrode (CT), regardless of whether or not the potential at the pixel electrode (PIX) is greater than 0 V. Similarly, the positive polarity means that the potential at the pixel electrode (PIX) is higher than the potential at the counter electrode (CT), irrespective of whether the potential at the pixel electrode (PIX) is greater or less than 0 V.

Similarly, at the subpixel B shown in FIG. 22, a reference voltage (V-CT-L) at L level is applied to the counter electrode (CT) of the transmissive portion 30. A reference voltage (V-CT-H) at H level is applied to the counter electrode (CT) of the reflective portion 31. At the subpixel B shown in FIG. 22, a video voltage (V-PX) is applied to the pixel electrode (PIX). The video voltage is of positive polarity when viewed from the transmissive portion 30. The video voltage is of negative polarity when viewed from the reflective portion 31.

The video voltage (V-PX) applied to the pixel electrode (PIX) is a potential between the reference voltage (V-CT-H) at H level and the reference voltage (V-CT-L) at L level.

Accordingly, at the subpixels indicated by A and B, respectively, in FIG. 22, the potential difference (Va in FIG. 23) between the pixel electrode (PIX) and the counter electrode (CT) is increased in the transmissive portion 30. In the reflective portion 31, the potential difference (Vb in FIG. 23) between the pixel electrode (PIX) and the counter electrode (CT) is reduced.

Therefore, where the potentials shown in FIG. 23 are applied, the potential difference Va between the pixel electrode (PIX) and the counter electrode (CT) in the transmissive portion 30 is greater, giving rise to a higher level of brightness. At this time, the potential difference Vb between the pixel electrode (PIX) and the counterelectrode (CT) in the reflective portion 31 is smaller, similarly producing a higher level of brightness.

In the transmissive portion 30, if the potential (potential of the video signal) at the pixel electrode (PIX) is varied to a potential different from the potential shown in FIG. 23 to increase the potential difference Va between the pixel electrode (PIX) and the counter electrode (CT) further, the potential difference Vb between the pixel electrode (PIX) and the counter electrode (CT) in the reflective portion 31 decreases further. Consequently, both transmissive portion 30 and reflective portion 31 become brighter.

Conversely, in the transmissive portion 30, if the potential (potential of the video signal) at the pixel electrode (PIX) is varied to a potential shown in FIG. 23 to reduce the potential difference Va between the pixel electrode (PIX) and the counter electrode (CT), the potential difference Vb between the pixel electrode (PIX) and the counter electrode (CT) in the reflective portion 31 increases. In consequence, both transmissive portion 30 and reflective portion 31 become darker.

In this way, within one subpixel, the counter electrode (CT) is split into two parts for the transmissive portion and reflective portion, respectively. Reference voltages of opposite polarities are applied to the counter electrode (CT) of the transmissive portion 30 and the counter electrode (CT) of the reflective portion 31. That is, when one of the reference voltages is at H level, the other is at L level. Inversion of bright and dark portions between the transmissive portion 30 and reflective portion 31 can be prevented. That is, the problem of inversion of bright and dark portions is solved by devising the voltage applied to the counter electrode (CT) of the reflective portion 31 although the transmissive portion 30 operates in normally black mode and the reflective portion 31 operates in normally white mode.

Embodiment 1

FIG. 1-1 is a plan view of a transflective liquid crystal display device of Embodiment 1 of the present invention, showing the subpixel electrode structure.

Figures 1, 2:
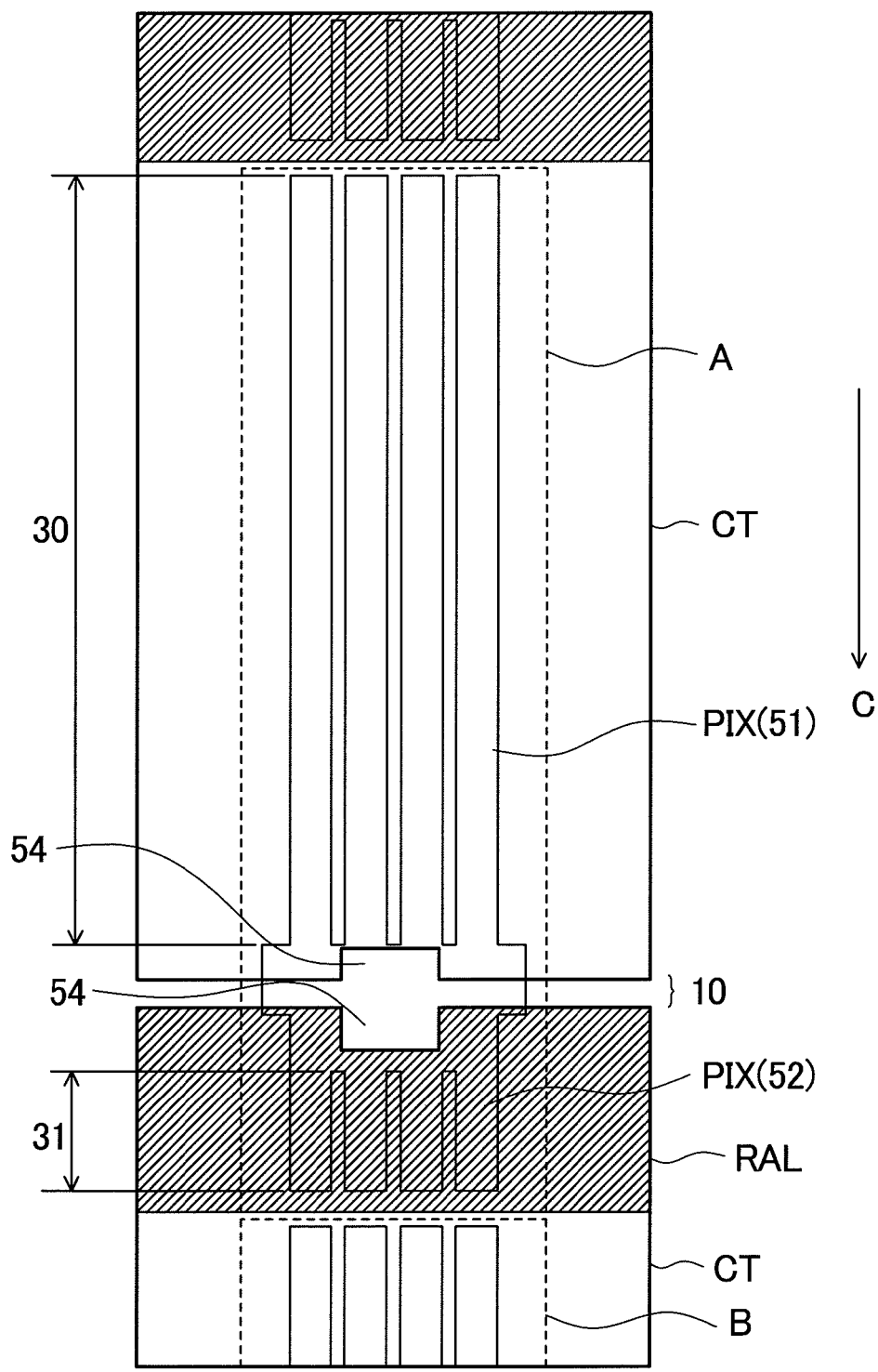
Figure 2:
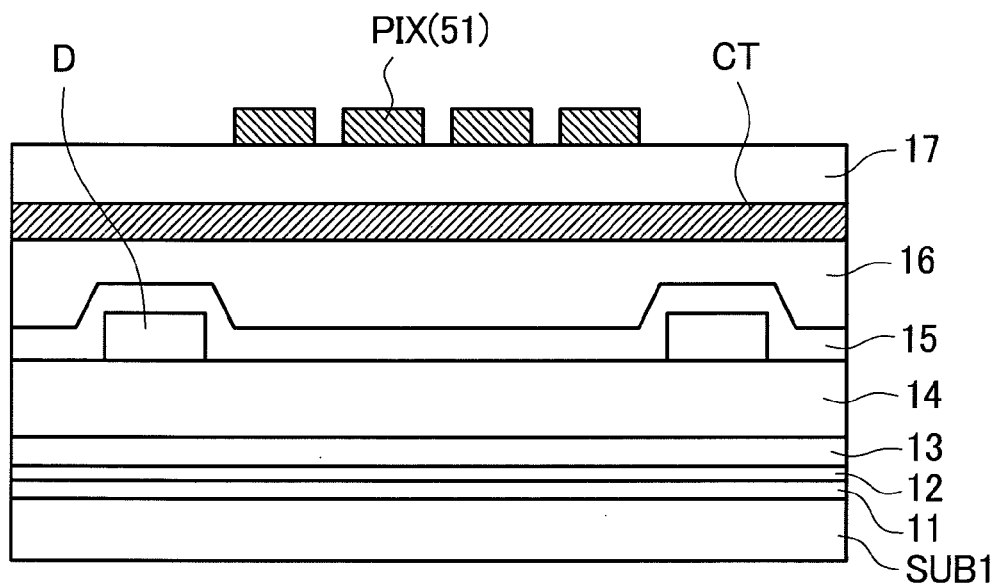

FIG. 1-2 shows only the pixel electrodes, counter electrodes, and reflective electrodes extracted from the display shown in FIG. 1-1. In FIG. 1-2, each of portions indicated by dotted frames A and B is one subpixel.

As shown in FIG. 1-2, in the present Embodiment 1, too, a pixel electrode (PIX) is used commonly within one subpixel. A counter electrode (CT) is split into two independent portions for the transmissive portion 30 and reflective portion 31, respectively. The reflective electrode (RAL) is formed on the counter electrode (CT) of the reflective portion 31.

In FIG. 1-2, the counter electrode (CT) of the reflective portion 31 on one of two adjacent display lines which has the subpixel A in FIG. 1-2 and the counter electrode (CT) of the transmissive portions 30 on the other display line having the subpixel B in FIG. 1-2 are fabricated from a common electrode. The direction of scanning is indicated by the arrow C in FIG. 1-2.

The pixel electrode (PIX) is composed of a connector portion 53, sawtooth electrodes 51 used for the transmissive portion and formed on the opposite sides of the connector portion 53, and a sawtooth electrode 52 for the reflective portion. Contact holes (described later) are formed in the region of the connector portion 53.

A recessed portion 54 for forming the contact holes is formed in the side opposite to the counter electrode (CT).

Figure 3:
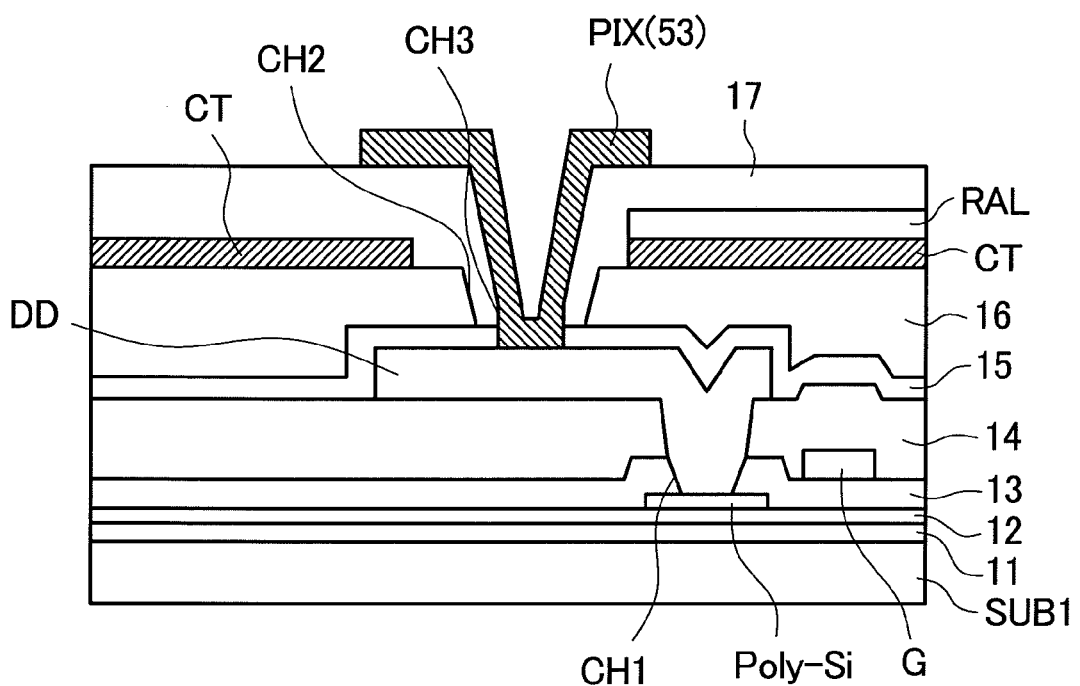
FIG. 3 is a cross-sectional view of main portions, showing the cross-sectional structure along line B-B' of FIG. 1-1.
Figure 4:
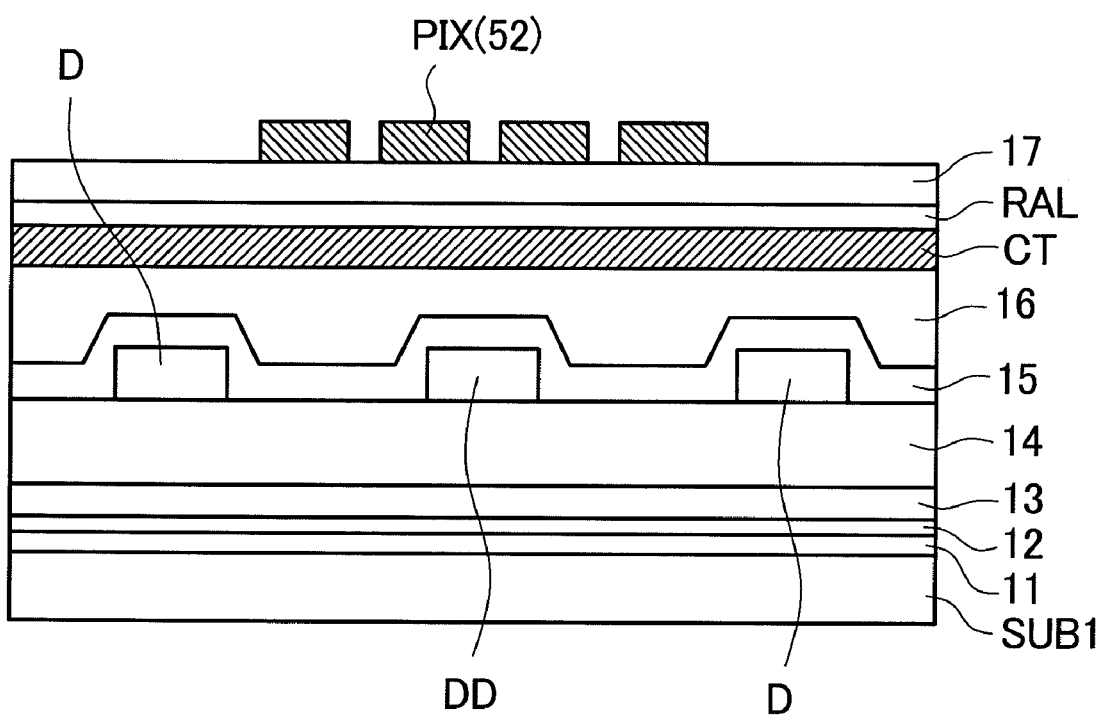
FIG. 4 is a cross-sectional view of main portions, showing the cross-sectional structure along line C-C' of FIG. 1-1.
Figure 5:
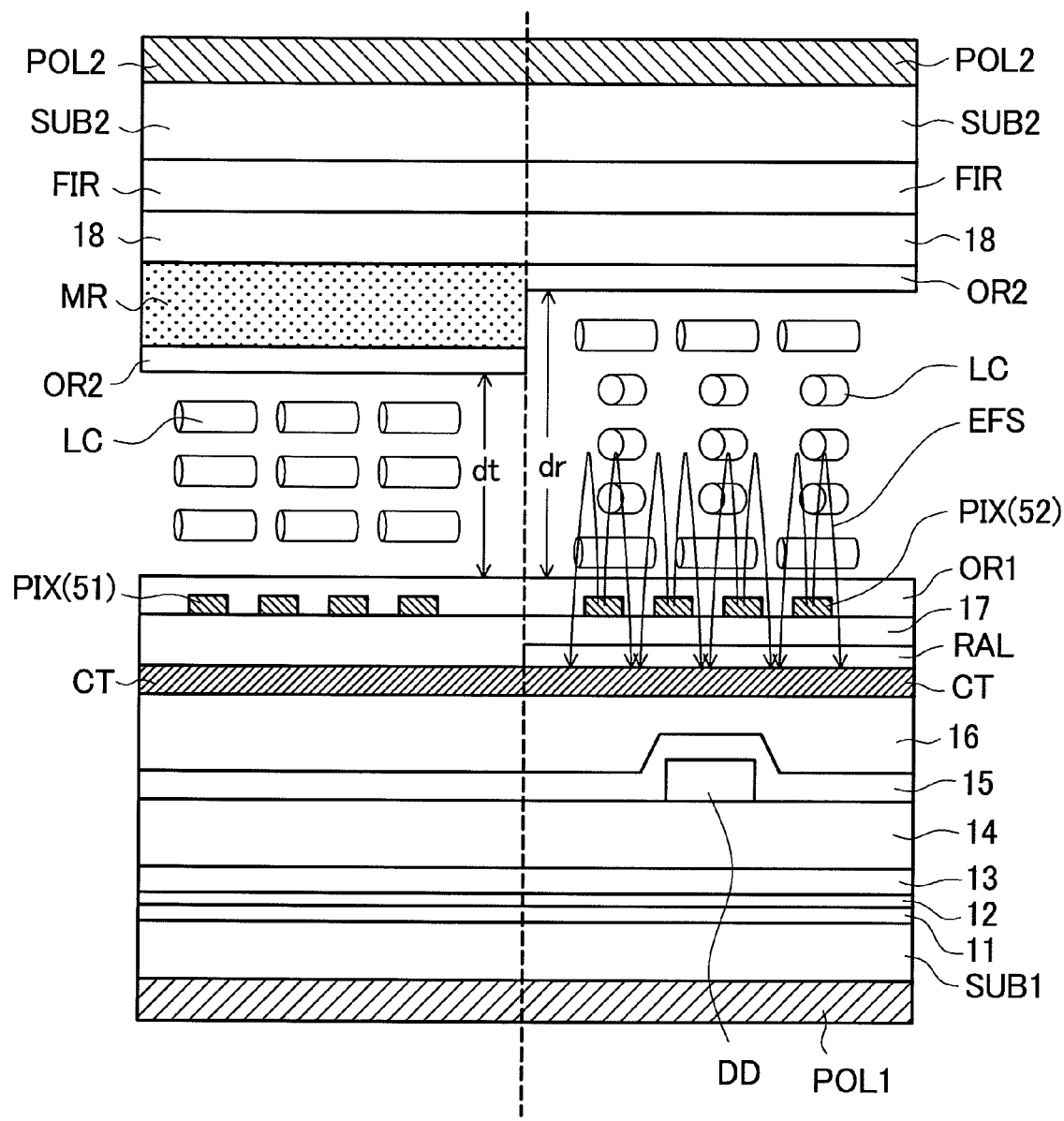
FIGS. 5A and 5B are cross-sectional views of main portions, showing cross-sectional structures along line E-E' and line F-F', respectively, of FIG. 1-1.
Figure 6:
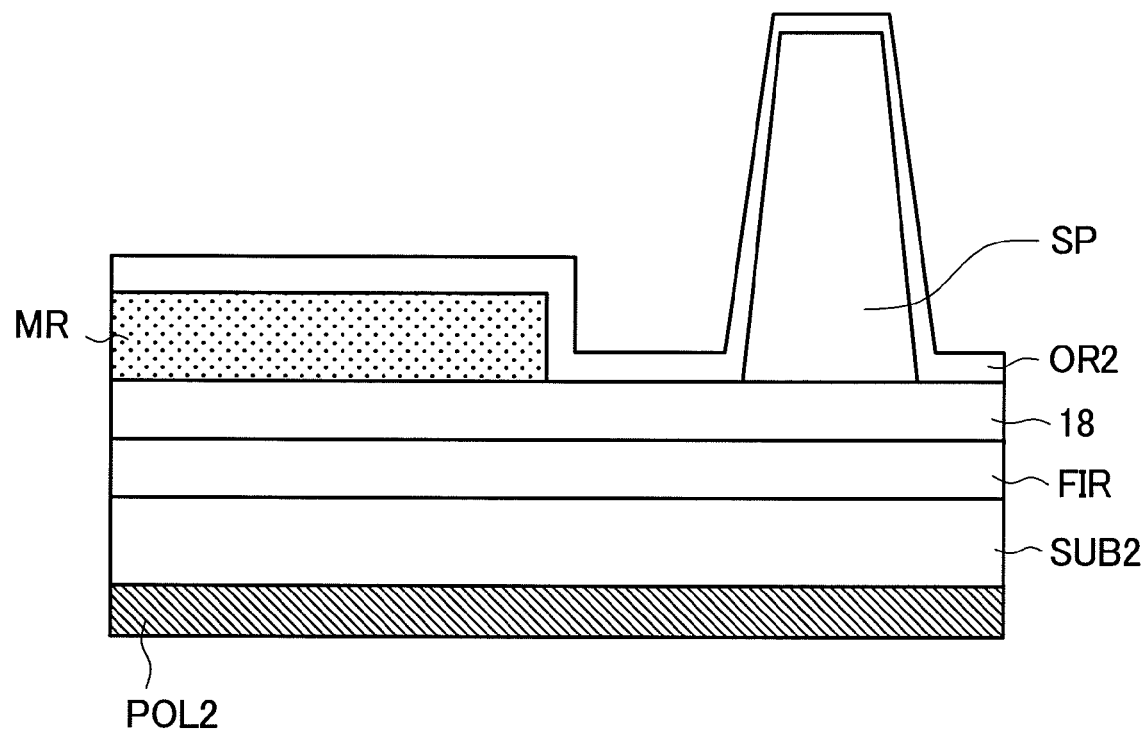
FIG. 6 is a cross-sectional view of main portions, showing the cross-sectional structure of the post spacer shown in FIG. 1-1.

FIG. 2 is a cross-sectional view of main portions, showing the cross-sectional structure along line A-A' of FIG. 1-1. FIG. 3 is a cross-sectional view of main portions, showing the cross-sectional structure along line B-B' of FIG. 1-1. FIG. 4 is a cross-sectional view of main portions, showing the cross-sectional structure along line C-C' of FIG. 1-1. FIGS. 5A and 5B are cross-sectional views of main portions, showing cross-sectional structures along line E-E' and line F-F', respectively, of FIG. 1-1. FIG. 6 is a cross-sectional view of main portions, showing the cross-sectional structure of the post spacer shown in FIG. 1-1.

FIG. 5A shows the cross-sectional structure along the line E-E' of FIG. 1-1, i.e., the cross-sectional structure of the transmissive portion 30. FIG. 5B shows a cross-sectional structure along the line F-F' of FIG. 1-1, i.e., the cross-sectional structure of the reflective portion 31.

The whole structure of the transflective liquid crystal display device of the present Embodiment 1 is described below by referring to FIGS. 5A-5B and 6.

In the present Embodiment 1, a liquid crystal layer (LC) containing a number of liquid crystal molecules is sandwiched between a pair of glass substrates (SUB1, SUB2) as shown in FIGS. 5A-5B. The main surface side of the glass substrate (SUB2) is on the observer's side.

A black matrix (not shown), color filters (FIR), a dielectric film 18, and an orientation film (OR2) are formed in this order on the side of the glass substrate (SUB2) of the reflective portion 31 (FIG. 5B) from the glass substrate (SUB2) toward the liquid crystal layer. Post spacers (SP) are formed between the dielectric film 18 and the orientation film (OR2) on the side of the glass substrate (SUB2) of the reflective portion 31 as shown in FIG. 6.

The structure of the portion of the transmissive portion 30 (FIG. 5A) on the side of the glass substrate (SUB2) is identical with the reflective portion 31 except for the post spacers (SP) and except that a step formation layer (MR) is formed between the dielectric film 18 and the orientation film (OR2). A polarizer (POL2) is formed on the outer side of the glass substrate (SUB2).

Interlayer dielectric films (11-16), the counter electrode (CT), another interlayer dielectric film 17, the pixel electrode (PIX), and an orientation film (OR1) are formed in this order from the glass substrate (SUB1) toward the liquid crystal layer on the side of the glass substrate (SUB1) of the transmissive portion 30 (FIG. 5A).

The structure of the side of the glass substrate (SUB1) of the reflective portion 31 (FIG. 5B) is identical with the transmissive portion 30 except that the reflective electrode (RAL) is formed between the counter electrode (CT) and the interlayer dielectric film 17. A polarizer (POLL) is formed on the outside of the glass substrate (SUB1).

In FIGS. 2-4, 5A-5B, and 6, there are shown video lines D (also referred to as source lines), scanning lines G (also referred to as gate lines), a semiconductor layer Poly-Si, the drain electrode DD of a thin-film transistor (TFT), and contact holes CH1-CH3. The lines of electric force are indicated by EFS.

The pixel electrode (PIX) and the counter electrode (CT) are made of a transparent conductive film made, for example, of ITO (indium tin oxide).

The counter electrode (CT) is a planar electrode. The pixel electrode (PIX) and counter electrode (CT) are superimposed over each other via the interlayer dielectric film 17, thus forming a retaining capacitor.

For example, the reflective electrode (RAL) is made of a metal film of aluminum (Al). The structure of the reflective electrode is not limited to this. For instance, the reflective electrode may be a two-layer structure including a lower layer of molybdenum (Mo) and an upper layer of aluminum (Al).

The step formation layer (MR) is used to adjust the cell gap length (dt) of the liquid crystal layer (LC) of the transmissive portion 30 such that the optical length of the transmissive portion 30 for light becomes equal to the optical length equivalent to $\lambda/2$ wavelength. The post spacers (SP) are used to adjust the cell gap length (dr) of the liquid crystal layer (LC) of the reflective portion 31 such that the optical length of the reflective portion 31 for light becomes equal to the optical length equivalent to $(3/4)\lambda$ for a single path of light. The optical length is equivalent to $(3/2)\lambda$ for a reciprocation of light. No retardation film is formed on the transmissive portion 30 or on the reflective portion 31.

Where the counter electrode (CT) is split into two for the transmissive portion 30 and the reflective portion 31 within one subpixel as in the present embodiment, different voltages are applied. Therefore, an electric field that cannot be controlled with the pixel electrode (PIX) is produced in the gap or break 10 between the opposite portions of the counter electrode (CT).

When black is displayed, for example, the uncontrollable field produces optical leakage locations in the transmissive portion 30 near the gap 10 between the opposite parts of the counter electrode (CT). As a result, the contrast of the transmissive portion 30 is deteriorated.

Accordingly, the pixel electrode (PIX) is made to overlap the gap 10 between the opposite parts of the counter electrode (CT) to permit the liquid crystal material to be controllably driven by the electric field between the pixel electrode (PIX) and the opposite parts of the counter electrode (CT) even in the gap 10 between the opposite parts of the counter electrode (CT). Hence, light leakage can be suppressed.

As shown in FIGS. 5A-5B, the step formation portion (MR) is formed in the transmissive portion 30. The cell gap length (dr) of the reflective portion 31 is greater than the cell gap length (dt) of the transmissive portion 30. That is, the liquid crystal layer (LC) in the reflective portion 31 is thicker than the liquid crystal layer (LC) in the transmissive portion 30.

The cell gap length (dt) of the transmissive portion 30 is so set that the effective retardation value of the liquid crystal is about $\lambda/2$ (wavelength $\lambda=550$ nm) because of the balance between coloring when white is displayed and the transmission efficiency.

On the other hand, with respect to the cell gap length (dr) of the reflective portion 31, coloring of the reflective portion 31 when white is displayed does not depend on the cell gap length (dt) because the reflective portion 31 operates in normally white mode. Therefore, the cell gap length (dr) is so determined that the reflectivity when black is displayed is low. That is, the reflection contrast ratio is high. Effective retardation values of the liquid crystal at which the reflection contrast ratio is high are peaked around $\lambda/4$ and $(3/4)\lambda$. If the cell gap length (dr) of the reflective portion 31 is small, uniform rotation of the liquid crystal molecules within a plane cannot be obtained by the effect of anchoring of the orientation film. For this reason, the reflection contrast ratio is higher when the effective retardation value of the liquid crystal is about $(3/4)\lambda$ for a single pass of light than when the value is about $\lambda/4$.

Where both transmissive portion 30 and reflective portion 31 operate in normally black mode, it is impossible to set large the cell gap lengths (dt and dr) of the transmissive portion 30 and reflective portion 31 because of the coloring problem when white is displayed. In contrast, where the transmissive portion 30 operates in normally black mode while the reflective portion 31 operates in normally white mode as in the present Embodiment 1, no retardation is produced in the liquid crystal layer (LC) of the reflective portion 31 when white is displayed. Consequently, the cell gap length (dr) of the reflective portion 31 can be increased without being affected by coloring.

If the cell gap length varies in normally white mode, coloring is not affected when white is displayed for the following reason. In normally white mode, the liquid crystal material is not driven when white is displayed. The state of polarization of light is not affected by the liquid crystal material. Consequently, if the cell gap length varies, white can be displayed without coloring at all times. In contrast, in normally black mode, white is displayed by driving the liquid crystal material. Hence, there exists an optimum cell gap length.

The aforementioned relationship between the cell gap length (dt) of the transmissive portion 30 and the cell gap length (dr) of the reflective portion 31 is now summarized.

cell gap length $(3/4)\lambda$ of the reflective portion 31 for a single pass of light>cell gap length (about $\lambda/2$) of the transmissive portion 30

To achieve this relationship, in the present Embodiment 1, the step formation layer (MR) is formed in the transmissive portion 30 to realize "the cell gap length (dr) of the reflective portion 31>the cell gap length (dt) of the transmissive portion 30". That is, the relationship "the thickness of the liquid crystal layer (LC) in the reflective portion 31>the thickness of the liquid crystal layer (LC) in the transmissive portion 30" is established.

If the cell gap length (dr) of the reflective portion 31 is increased, the molecules of the liquid crystal material in the reflective portion 31 rotate substantially uniformly within a plane when black is displayed. If the cell gap length (dr) is large, rotation of the liquid crystal molecules is uniform within a plane without being affected by the anchoring of the orientation film and so the reflectivity can be lowered. Accordingly, as in the present Embodiment 1, black reflectivity of the reflective portion 31 can be lowered by setting the relationship "the cell gap length (dr) of the reflective portion 31>the cell gap length (dt) of the transmissive portion 30". Consequently, the contrast ratio of the reflective portion 31 can be improved.

A method of fabricating the components shown in FIGS. 2-4 and 5A-5B is described. First, fabrication of various parts of the glass substrate SUB1 is described. Process steps carried out prior to (1) are the same as normal process steps and so their description is omitted.

(1) Video Lines (D), Drain Electrodes (DD) of TFTs, and Interlayer Dielectric Film 15:

A lower layer Ti, an intermediate layer Al, and an upper layer Ti are formed by a patterning technique to form the video lines (D) and the drain electrodes (DD) of the TFTs. Then, an SiN film is formed to a thickness of 200 nm by CVD to form the interlayer dielectric film 15.

(2) Interlayer Dielectric Film 16:

After forming the interlayer dielectric film 15, a photosensitive resin is applied. The resin is exposed using a photomask on which a desired pattern is written. The resist is selectively removed with an alkali developer. At this time, the portions of the resist which correspond to the contact holes (CH2) are removed.

The unevenness of the substrate surface can be controlled by the conditions under which the resin is sintered. In the present Embodiment 1, the sintering process is performed at 230° C. for 60 minutes such that the substrate surface is roughly planarized except for the contact holes.

Furthermore, the thickness of the interlayer dielectric film 16 (i.e., the planarized portion of the surface of the pixel electrode except for the contact holes) is set to about 1.8 μm after the sintering.

(3) Counter Electrode (CT):

After forming a layer of an amorphous ITO having a thickness of 77 nm by a sputtering technique, a photosensitive resist is applied. A photomask on which a desired pattern is written is exposed with a mask, and the resist is selectively removed with an alkali developer. Where the resist is of the positive type, the exposed portions are removed. Using the pattern of the resist as a mask, the ITO is etched away using an etchant such as oxalic acid. In the present embodiment, the pattern is so devised that the contact holes (CH3) are located between the opposite counter electrodes (CT).

Then, the resist is removed with a resist stripper such as MEA (monoethanol amine). Finally, a thermal treatment is performed at 230° C. for 60 minutes to prevent the amorphous ITO from being dissolved by an acidic liquid used when the reflective electrode (RAL) including the upper layer of AlSi and lower layer of MoW is processed in the next step. The amorphous ITO is crystallized.

(4) Reflective Electrode (RAL):

After forming the lower layer of MoW (50 nm) and the upper layer of AlSi (150 nm) in succession by sputtering techniques, a photosensitive resist is applied. The resist is exposed with a photomask having a desired pattern written thereon. The resist is selectively removed away with an alkali developer. Where the resist is of the positive type, the exposed portions are removed. Using the resist pattern as a mask, the reflective electrode (RAL) is etched away with an etchant.

Then, the resist is removed with a resist stripper such as MEA (monoethanol amine). In the present embodiment, the resist pattern is so devised that the reflective electrode (RAL) is formed only on one counter electrode (CT) near the contact holes (CH3).

(5) Interlayer Dielectric Film 17:

This is formed by the same method as used to form the interlayer dielectric film 16. In the present embodiment, however, the interlayer dielectric film 17 is formed also inside the contact holes (CH2). Holes are formed in the interlayer dielectric film 17. The lower interlayer dielectric film 15 is processed using the pattern of the holes. In this way, the contact holes (CH3) are formed. The interlayer dielectric film 15 is processed by a dry etching technique using ($SF_6+O_2$) or $CF_4$ gas.

(6) Pixel Electrode (PIX):

After forming a film of ITO by sputtering to a thickness of 77 nm, a photosensitive resist is applied. The resist is exposed with a photomask having a desired pattern written thereon. The resist is selectively removed with an alkali developer. Where the resist is of the positive type, the exposed portions are removed. Using the resist pattern as a mask, they are removed with an ITO etchant such as oxalic acid. Then, the resist is removed with a resist stripper such as MEA (monoethanol amine). The pixel electrode (PIX) is formed as a sawtooth pattern on the counter electrode (CT).

Fabrication of the various parts of the glass substrate (SUB2) is next described by referring to FIG. 6. During fabrication of the glass substrate (SUB2), the step formation layer (MR) is formed after processing of color filters (FIR) to make the cell gap length of the reflective portion 31 greater than the cell gap length of the transmissive portion 30. This process step is next described. The other steps are identical with ordinary steps and so description of these steps is omitted.

(7) Step Formation Layer (MR):

After forming the dielectric film 18 on the glass substrate (SUB2), a photosensitive resist is applied. The resist is exposed with a photomask having a desired pattern written thereon. The resist is selectively removed with an alkali developer. Where the resist is of the positive type, the exposed portions are removed. The resist is sintered at 230° C. for 60 minutes under atmospheric conditions. The thickness of the step formation layer (MR) is 1.5 μm after the sintering. The step formation layer (MR) is formed only on the transmissive portion 30.

(8) Post Spacers (SP):

After the formation of the step formation layer (MR), a photosensitive resist is applied. The resist is exposed with a photomask having a desired pattern written thereon. The resist is selectively removed with an alkali developer. Where the resist is of the positive type, the exposed portions are removed. The resist is sintered at 230° C. for 60 minutes under atmospheric conditions. The height of the post spacers (SP) is 5.5 μm after the sintering.

Figure 7:
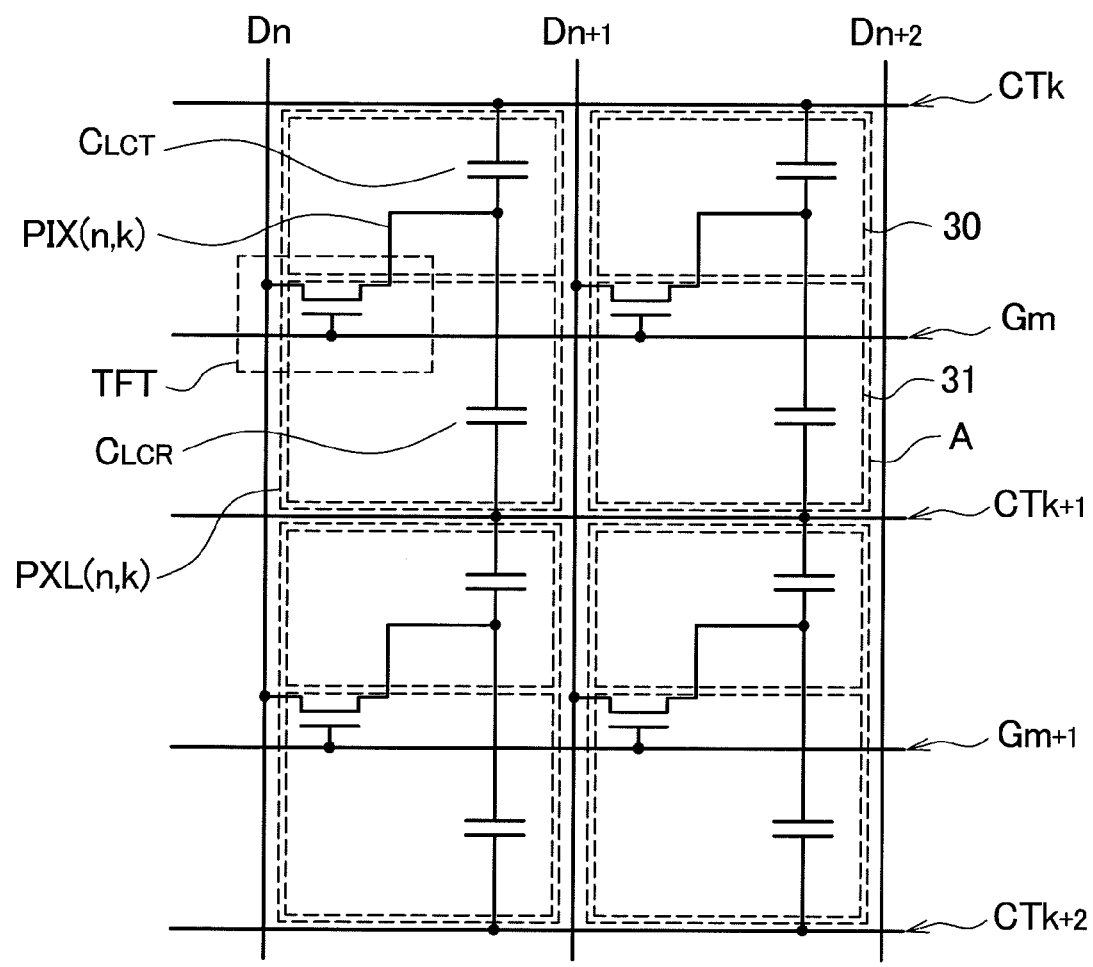
FIG. 7 is an equivalent circuit diagram of the LCD panel of the transflective liquid crystal display device of Embodiment 1 of the invention.

FIG. 7 is an equivalent circuit diagram of the LCD panel of the transflective liquid crystal display device of the present Embodiment 1. In FIG. 7, Dn, Dn+1, and Dn+2 indicate the nth, (n+1)th, and (n+2)th video lines, respectively. Gm and Gm+1 indicate the mth and (m+1)th scanning lines, respectively. CTk, TCk+1, and CTk+2 indicate the kth, (k+1)th, and (k+2)th counter electrodes, respectively. A indicates one subpixel. CLCT indicates the liquid crystal capacitor of the transmissive portion 30. CLCR indicates the liquid crystal capacitor of the reflective portion 31.

The direction in which the video lines (D) extend intersects, perpendicularly or nonperpendicularly, the direction in which the scanning lines (G) and counter electrodes (CT) extend. The counter electrodes (CT) are arranged in a stripe pattern.

The source electrodes of the thin-film transistors (TFTs) are connected with the video lines (D). The drain electrodes (DD) of the TFTs are connected with the pixel electrodes (PIX). A voltage on the video lines (D) is applied to the pixel electrodes (PIX) via the TFTs.

The gate electrodes of the TFTs are connected with the scanning lines (G). The scanning lines (G) turn on and off the TFTs.

In the present embodiment, within one subpixel, the transmissive portion 30 and the reflective portion 31 use the common pixel electrode (PIX) but use different counter electrodes (CT) which are at different potentials.

When the voltage on the scanning line (Gm) goes high, the TFT turns on, writing a video potential into the pixel electrode (PIX (n, k)).

After the voltage on the scanning line (Gm) goes low, the voltage written in during the period of the high level is retained by the retaining capacitor formed within the subpixel (PXL) until the scanning line (Gm) goes high in the next frame. As described previously, the retaining capacitor is formed by the counter electrode (CT) formed planarily, the pixel electrode (PIX), and the interlayer dielectric film 17 formed between the counter electrode (CT) and the pixel electrode (PIX).

The counter electrodes (CTk) and (CTk+1) are at different voltages levels. For example, when the counter electrode (CTk) is at H level, the counter electrode (CTk+1) is at Low level except immediately before the scanning line (Gm) goes to H level.

The liquid crystal molecules (LC) in the transmissive portion 30 are driven by the potential difference between the counter electrode (CTk) and the pixel electrode (PIX (n, k)). The liquid crystal molecules (LC) in the reflective portion 31 are driven by the counter electrode (CTk+1) and the pixel electrode (PIX(n, k)).

In the present Embodiment 1, the voltages applied to the liquid crystal molecules in the transmissive portion 30 and reflective portion 31, respectively, are controlled in this way.

Figure 8:
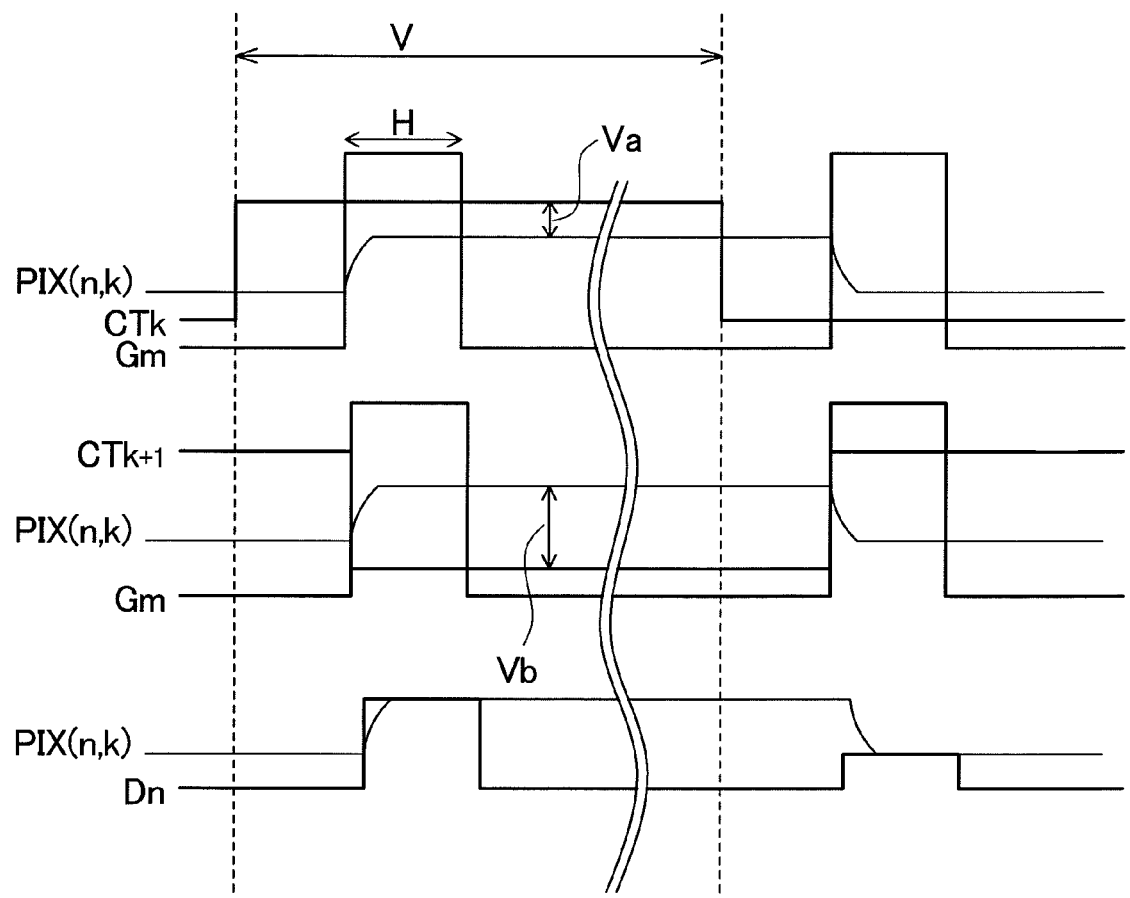
FIG. 8 is a diagram showing the voltage waveform applied on the subpixel ((PXL) (n, k)) shown in FIG. 7.

The voltage waveform on the subpixel ((PXL) (n, k))) shown in FIG. 7 is shown in FIG. 8. In FIG. 8, Va indicates the potential difference between the pixel electrode (PIX) and the counter electrode (CT) in the transmissive portion 30. Vb indicates the potential difference between the pixel electrode (PIX) and the counter electrode (CT) in the reflective portion 31. H indicates one horizontal scanning period. V indicates one vertical scanning period (frame period). Gm indicates a scanning signal. Dn indicates a video signal. PIX (n, k) indicates the potential at the pixel electrode (PIX). CTk, Ctk+1 indicate potentials at the counter electrodes (CT).

The present Embodiment 1 is now described in further detail. As shown in FIGS. 5A and 5B, the step formation layer (MR) is formed in the glass substrate SUB1 to adjust the retardation values (Δn·d) of the transmissive portion 30 and reflective portion 31. In the present Embodiment 1, the cell gap length (dt) of the transmissive portion 30 is set to 4 μm. The retardation value (Δn·d) of the transmissive portion 30 is set to 400 nm. The cell gap length (dr) of the reflective portion 31 is set to 5.5 μm. The retardation value (Δn·d) of the reflective portion 31 is set to 550 nm. Δn is the anisotropic refractive index of the liquid crystal (in the present embodiment, Δn=0.10). dis the liquid crystal cell gap length. The used liquid crystal material is of the negative type.

In the transmissive portion 30, dt=4 μm and Δn·d=400 nm. In practice, liquid crystal molecules present near the orientation film do not easily move. Therefore, the effective retardation of the liquid crystal material is about λ/2 (λ=550 nm). The reflective portion 31 is designed similarly.

As shown in FIGS. 5A and 5B, a polarizer (POL2) is disposed on the outside (upper side in the figure) of the glass substrate (SUB2). Another polarizer (POL1) is disposed on the outside (lower side in the figure) of the glass substrate (SUB1). The relationships among the polarization axis of the upper polarizer (POL2), the polarization axis of the lower polarizer (POL1) and the initial orientation axis (rubbing axis) of the liquid crystal material are so set that the polarization axis of the upper or lower polarizer is coincident with the liquid crystal initial orientation axis and that the polarization axes of the upper and lower polarizers are perpendicular to each other. Thus, normally black mode is achieved. In the present Embodiment 1, the polarization axis of the upper polarizer (POL2) is made coincident with the axis (rubbing axis) of the initial orientation of the liquid crystal material (set to the direction of 15°). The polarization axis of the lower polarizer (POL1) is made perpendicular to the polarization axis of the upper polarizer (POL2) and set to the direction of 105°. The transmissive portion 30 is operated in normally black mode. 15° and 105° are represented in terms of angles as measured in a counterclockwise direction; the horizontal direction (the direction of the scanning lines (G)) is set to 0°.

The axes of the transmissive portion 30 and reflective portion 31 are set as described previously and so light that enters from the side of the glass substrate (SUB2) and is reflected by the reflective electrode (RAL) is not varied in state of polarization by the liquid crystal material during travel through the optical path when no electric field is applied to the liquid crystal material. Therefore, the light passes through the upper polarizer (POL2). That is, the reflective portion 31 operates in normally white mode.

In terms of image quality, it is desired that the transmissive portion 30 and reflective portion 31 be identical instate of display. That is, preferably, when the transmissive portion 30 displays black, the reflective portion 31 also displays black. When the transmissive portion 30 displays white, the reflective portion 31 also displays white.

The transmissive portion 30 and reflective portion 31 use the common pixel electrode (PIX). The counter electrode (CT) is divided into two parts (CT) for the transmissive portion 30 and reflective portion 31, respectively. In this way, the liquid crystal materials in the transmissive portion 30 and reflective portion 31 are driven and controlled separately.

FIGS. 5A and 5B show the state in which both transmissive portion 30 and reflective portion 31 display black by causing only the pixel electrode (PIX) 52 of the reflective portion 31 and its counter electrode (CT) to produce an electric field without permitting the pixel electrode (PIX) 51 of the transmissive portion 30 or its counter electrode (CT) to produce an electric field.

The advantages of the present invention can be confirmed from the results of a simulation made by a liquid crystal display simulator.

Figure 9:
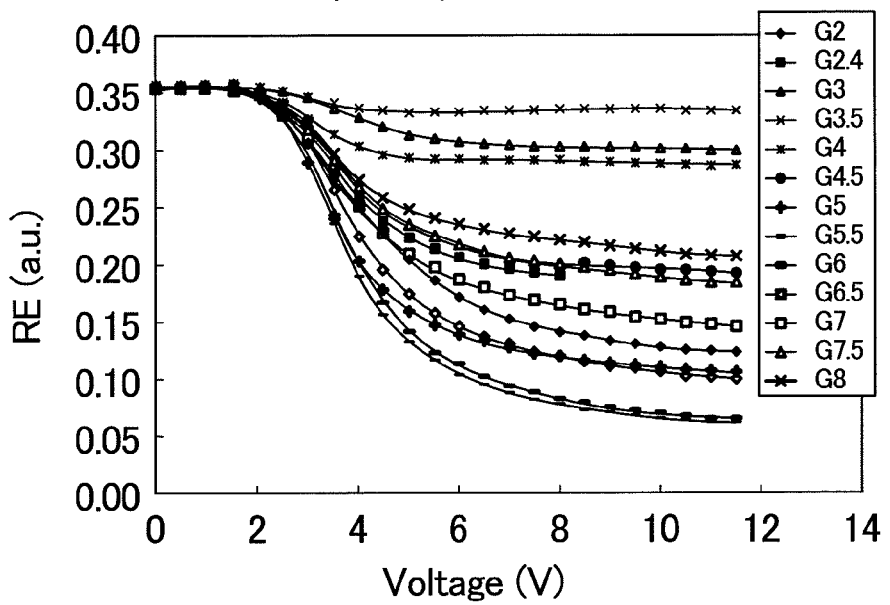
FIG. 9 is a graph showing the optical characteristics (voltage-reflection efficiency characteristics) of the reflective portions, the characteristics being calculated using a liquid crystal display simulator.
Figure 10:
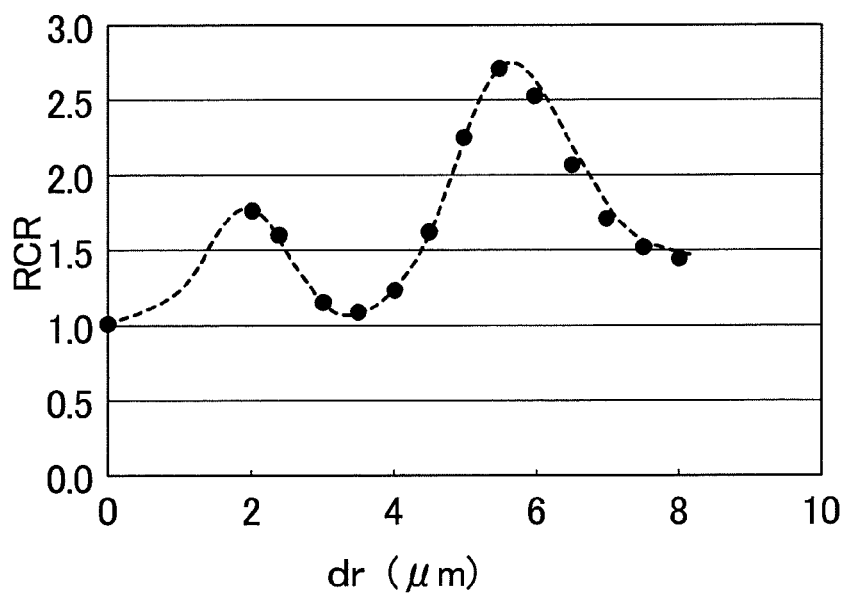
FIG. 10 is a graph showing the optical characteristics (cell gap length-reflection contrast characteristics) of the reflective portions, the characteristics being calculated using the liquid crystal display simulator.
Figure 11:
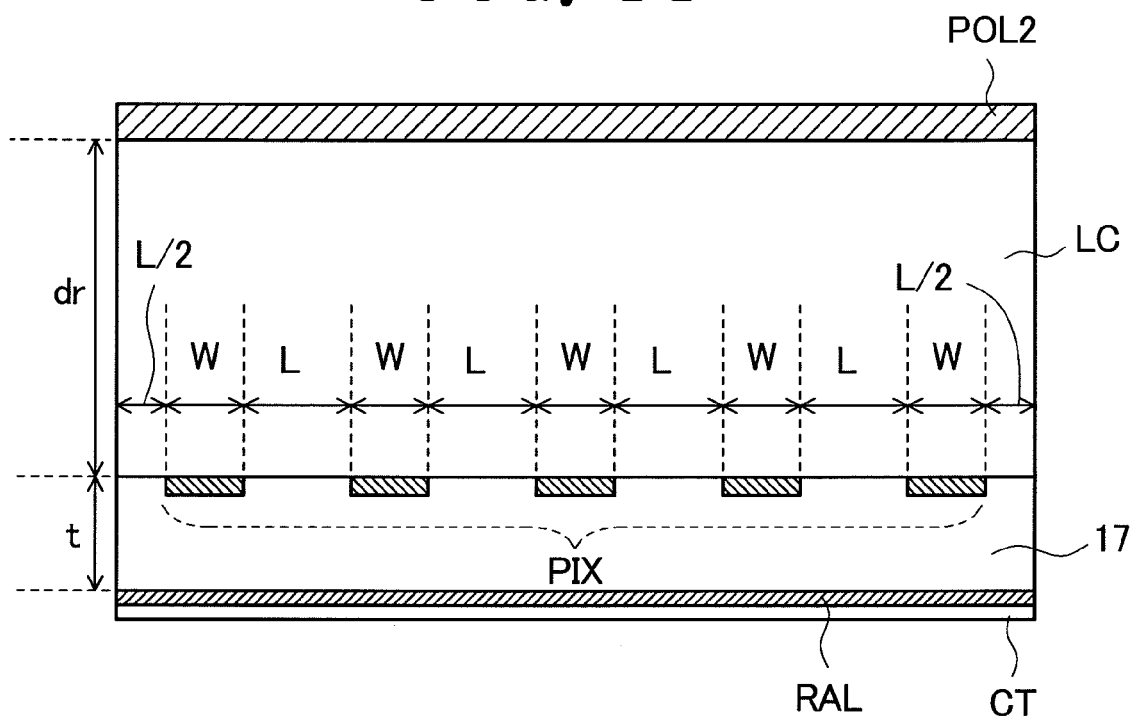
FIG. 11 is a diagram of a model used to calculate reflection characteristics.

FIGS. 9 and 10 show the optical characteristics of the reflective portion 31 calculated using the liquid crystal display simulator. The sawtooth pixel electrode width W of the reflective portion 31, the sawtooth electrode spacing L, the interlayer dielectric film thickness t, and the cell gap length dr are defined as shown in FIG. 11 that shows a model used to calculate reflection characteristics. Physical values of the liquid crystal material used for the calculations are shown in Table 1.

For the sake of convenience of the simulator, calculations were performed under the condition where the counter electrode (CT) was present on the reflective electrode (RAL), unlike in FIG. 11. However, the same results were obtained irrespective of the conditions.

TABLE 1

| Item | Details | Symbol | Unit | |
|---|---|---|---|---|
| Optical film | Absorption axis of upper polarizer | — | 15 | deg |
| Electrode | Width of sawtooth electrodes | W | 4 | μm |
| | Spacing of sawtooth electrodes | L | 4 | μm |
| | Longitudinal direction of sawtooth electrodes | — | 90 | deg |
| Interlayer dielectric film | Dielectric constant | — | 3.3 | — |
| | Film thickness | t | 400 | nm |
| Liquid crystal material | Anisotropic dielectric constant | — | −3.9 | — |
| | Anisotropic refractive index | Δn | 0.1 | — |
| | Orientation axis | — | 15 | deg |
| | Pretilt angle | — | 0 | deg |

FIG. 9 shows the voltage (v)-reflection efficiency (RE) characteristics of the reflective portion 31 when W, L, and t are fixed to 4 μm, 4 μm, and 0.4 μm, respectively. In FIG. 9, the numerical values placed after G's behind the explanatory notes indicate the cell gap lengths (dr). As shown in FIG. 9, it can be seen that the reflection coefficient (RE) when a voltage (v) is applied varies dependently on the cell gap length (dr).

FIG. 10 shows the cell gap length (dr)-reflection contrast (RCR) characteristics when the reflection contrast is set equal to (reflection efficiency that is maximized at voltages less than 5 V)/(reflection efficiency that is minimized at voltages less than 5 V). As shown in FIG. 10, the reflection contrast (RCR) is peaked when the cell gap length (dr) is 2 μm and 5.5 μm. The peak at 5.5 μm is higher. Furthermore, it can be seen that near the second peak, the range of the cell gap length (dr) at which higher contrast is obtained than at the first peak is from 4.6 to 7.0 μm.

Figure 12:
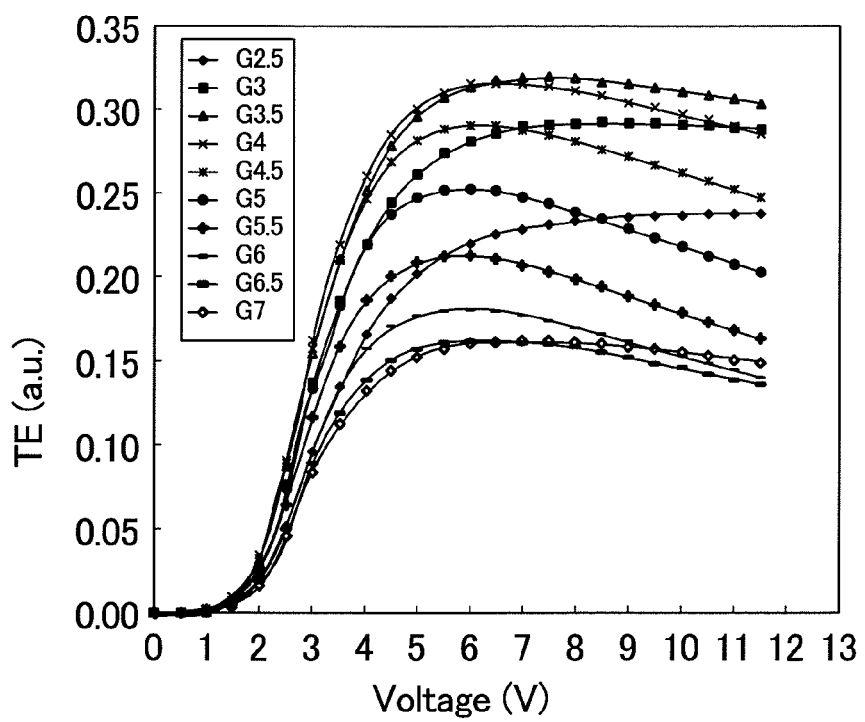
FIG. 12 is a graph showing the optical characteristics (voltage-transmission efficiency characteristics) of the transmissive portions, the characteristics being calculated using the liquid crystal display simulator.
Figure 13:
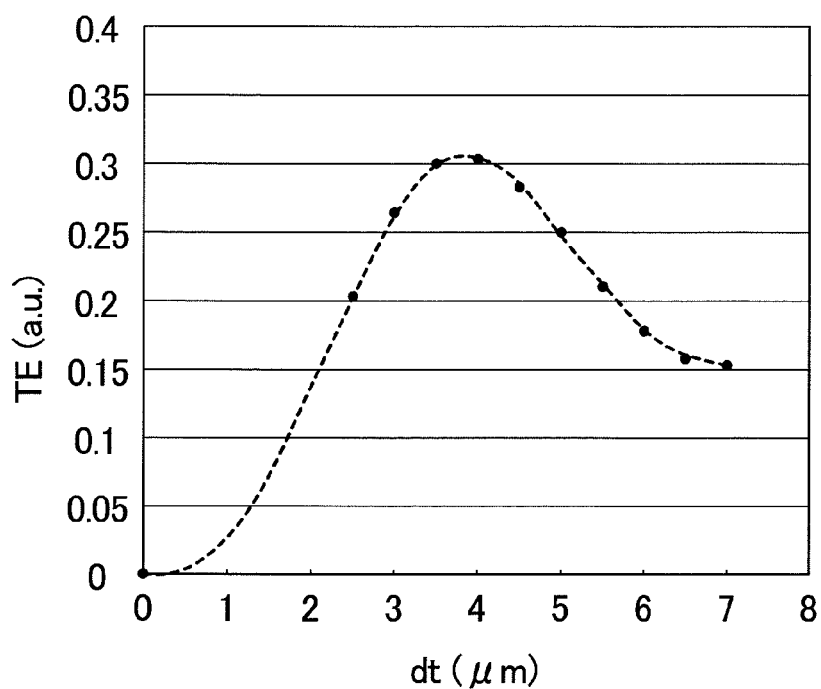
FIG. 13 is a graph showing the optical characteristics (cell gap length-transmission efficiency characteristics) of the transmissive portions, the characteristics being calculated using the liquid crystal display simulator.
Figure 14:
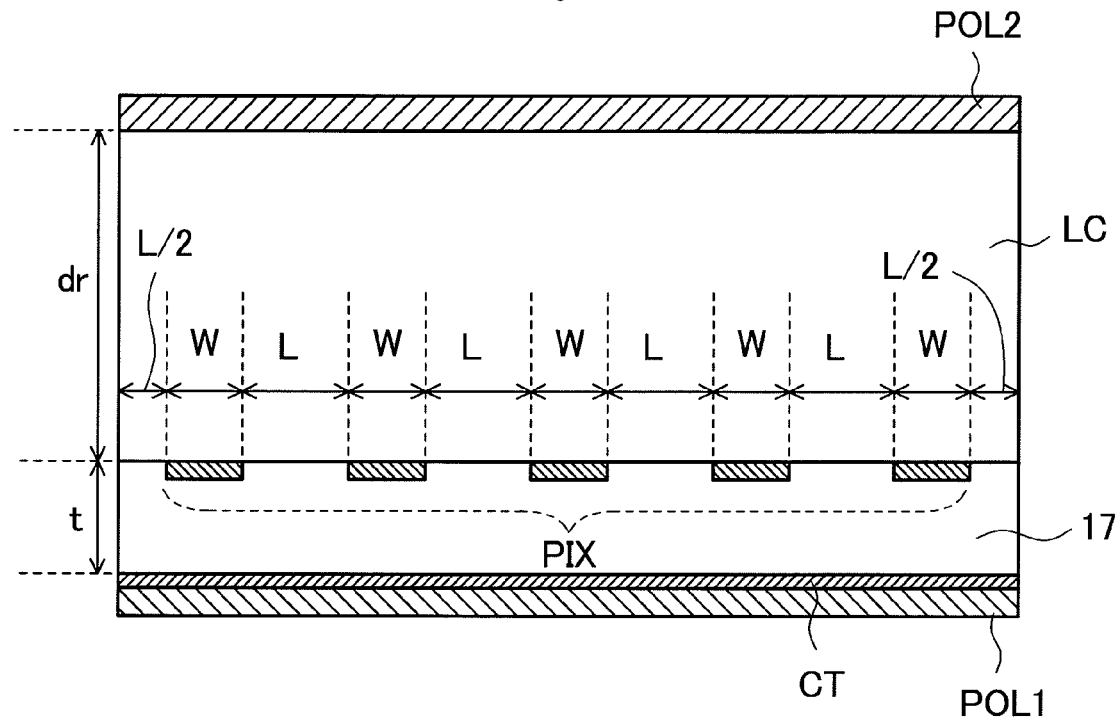
FIG. 14 is a diagram of a model used to calculate transmission characteristics.

The optical characteristics of the transmissive portion 30 calculated using the liquid crystal display simulator are shown in FIGS. 12 and 13. The width W of the sawtooth pixel electrodes, the spacing L of the sawtooth electrodes, the thickness t of the interlayer dielectric film, and the cell gap length dt of the transmissive portion 30 are defined as shown in FIG. 14 that shows a model used to calculate the transmission characteristics. Physical values of the liquid crystal material used for the calculations are shown in Table 2.

TABLE 2

| Item | Details | Symbol | Unit | |
|---|---|---|---|---|
| Optical film | Absorption axis of upper polarizer | — | 15 | deg |
| | Absorption axis of lower polarizer | — | 105 | deg |
| Electrode | Width of sawtooth electrodes | W | 5 | μm |
| | Spacing of sawtooth electrodes | L | 5 | μm |
| | Longitudinal direction of sawtooth electrodes | — | 90 | deg |
| Interlayer dielectric film | Dielectric constant | — | 3.3 | — |
| | Film thickness | t | 400 | nm |
| Liquid crystal material | Anisotropic dielectric constant | — | −3.9 | — |
| | Anisotropic refractive index | Δn | 0.1 | — |
| | Orientation axis | — | 15 | deg |
| | Pretilt angle | — | 0 | deg |

FIG. 12 shows the voltage (v)-transmission efficiency (TE) characteristics of the transmissive portion 30 when W, L, and t are fixed to 5 μm, 5 μm, and 0.4 μm, respectively. In FIG. 12, the numerical values placed after G's behind the explanatory notes indicate the cell gap lengths (dt). As shown in FIG. 12, it can be seen that the transmission coefficient (TE) when a voltage (v) is applied varies dependently on the cell gap length (dt).

FIG. 13 is a recompiled version of (cell gap length (dt))–(transmission efficiency (TE) when the voltage is 5 V) characteristics. The transmission efficiency (TE) almost maximizes when the cell gap length (dt) is 3.5 to 4 μm.

Figure 15:
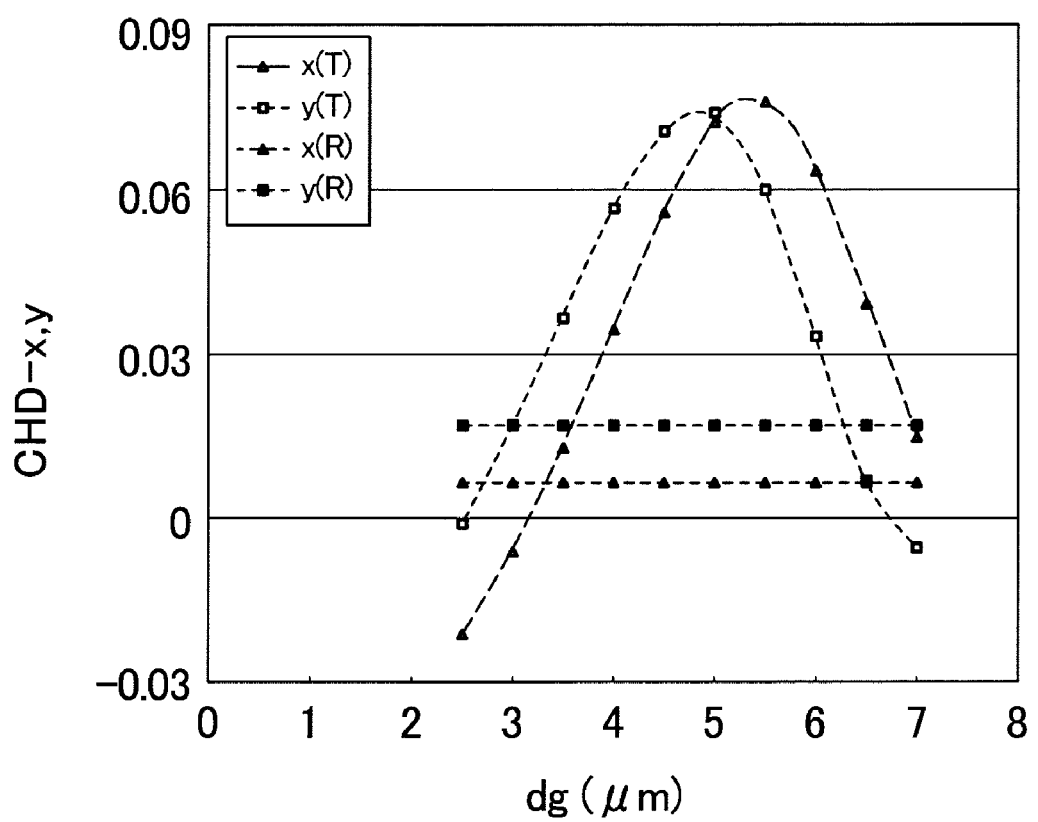
FIG. 15 is a graph showing chromaticity variations (cell gap length-dependence) caused by variations in cell gap length.

Chromaticity coordinates (XYZ color notation system of CIE) for reflection and transmission when white is displayed were found. Chromaticity coordinates of a BL light source were also found. Their differences (hereinafter referred to as the chromaticity differences) were found, and the degree of coloring when white was displayed was evaluated. It is meant that as the chromaticity differences increase, coloring becomes more intense. FIG. 15 is a diagram showing variations in chromaticity (cell gap dependence) caused by variations in the cell gap length. Where white was displayed, transmission occurred when a voltage of 5 V was applied. Reflection occurred when a voltage of 0 V was applied. Both of x(T) and y(T) of the chromaticity differences (CHD–x, y) of the transmissive portion 30 (T) depend on the cell gap length (dg). In contrast, neither x (R) nor y (R) of the chromaticity differences (CHD–x, y) of the reflective portion 31 (R) depends on the cell gap length.

Generally, a conceivable measure for avoiding coloring when white is displayed is adjustment of the transmission spectrum of the color filter substrate (counter substrate). However, the transmissivity and reflectivity deteriorate severely or the color reproducibility decreases. Therefore, a fundamental countermeasure is to suppress coloring due to the liquid crystal layer. It can be seen that in the present example of calculation, the cell gap length of the transmissive portion having no chromaticity differences is set to 3.2 μm and 2.5 μm when one takes notice of the x-coordinate and y-coordinate, respectively.

From the above example of calculation, the design range of the cell gap length (dt) of the transmissive portion 30 was set as follows. The lower limit of the cell gap length (dt) of the transmissive portion 30 was set to 2.5 μm, taking account of the chromaticity differences. The upper limit was set to 4 μm, taking account of the transmission efficiency. In the present Example 1, the cell gap length (dt) was set to 3.5 μm.

Meanwhile, with respect to the design range of the cell gap length (dr) of the reflective portion 31, the lower limit and the upper limit were set to 4.6 μm and 7.0 μm, respectively, taking account of the range in which the reflection contrast ratio was high. In the present Example 1, the cell gap length (dr) was set to 5.5 μm.

Where the transmissive portion 30 has the cell gap length (dt) of 3.5 μm and the reflective portion 31 has the cell gap length (dr) having a lower limit of 4.6 μm and an upper limit of 7.0 μm, the liquid crystal layer (LC) in the reflective portion 31 having a thickness of dr and the liquid crystal layer (LC) in the transmissive portion 30 having a thickness of dt preferably satisfy the relationship $1.3 \leq dr/dt \leq 2$. More preferably, $1.5 \leq dr/dt \leq 1.6$.

To achieve the above-described cell gaps of the transmissive portion 30 and reflective portion 31, the step formation layer (MR) having a thickness of 2 μm was formed in the transmissive portion 30 as described previously. Furthermore, the post spacers (SP) having a thickness of 5.5 μm were formed in the reflective portion 31 as described already.

Embodiment 2

Figure 16:
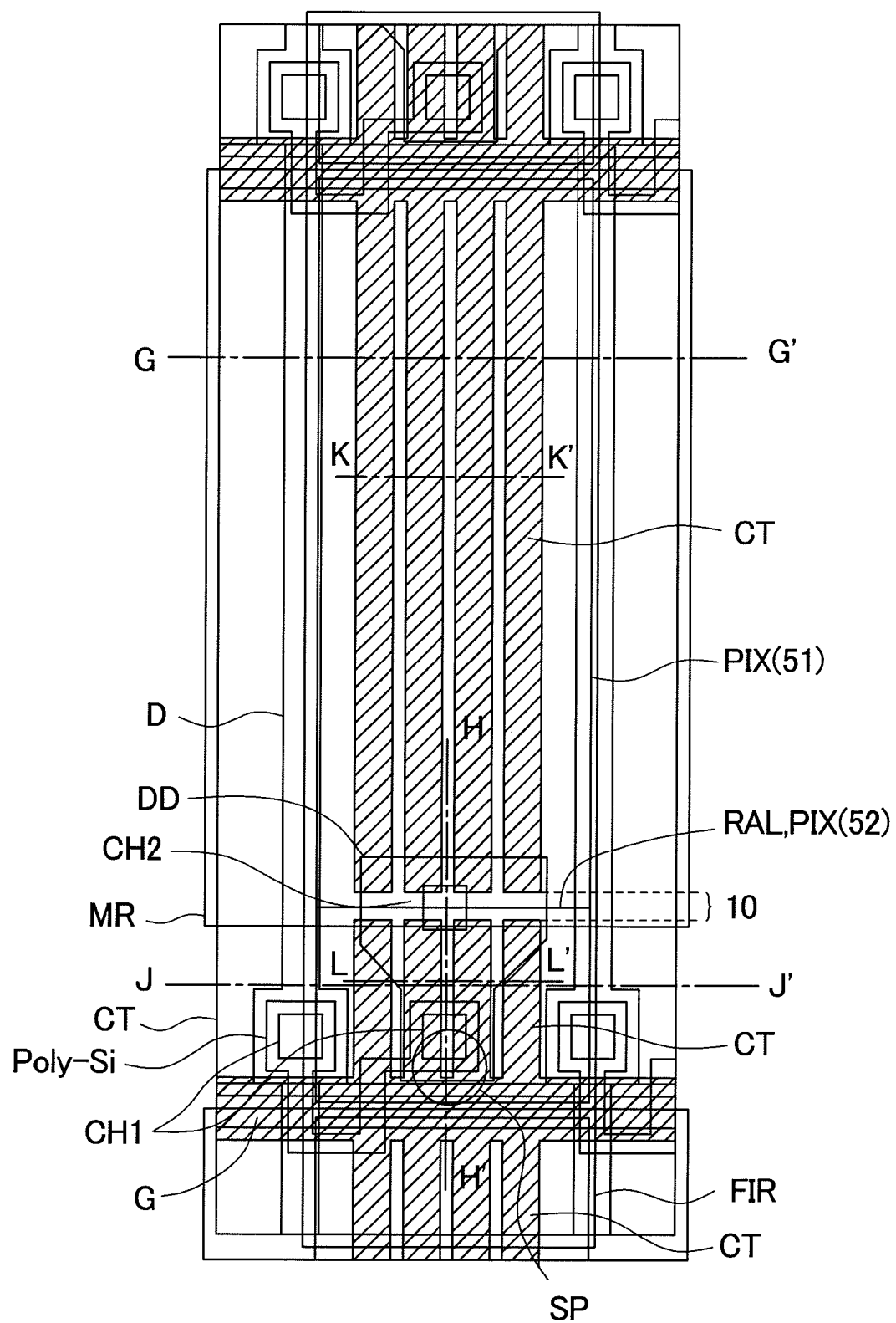
FIG. 16 is a plan view of a transflective liquid crystal display device of Embodiment 2 of the present invention, showing the subpixel electrode structure.
Figure 17:
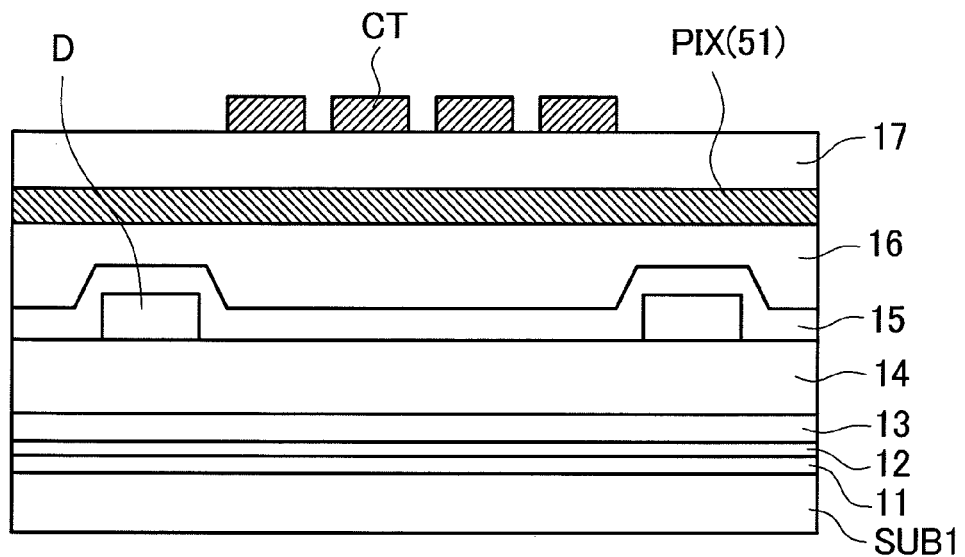
FIG. 17 is a cross-sectional view of main portions, showing the cross-sectional structure along line G-G' of FIG. 16.
Figure 18:
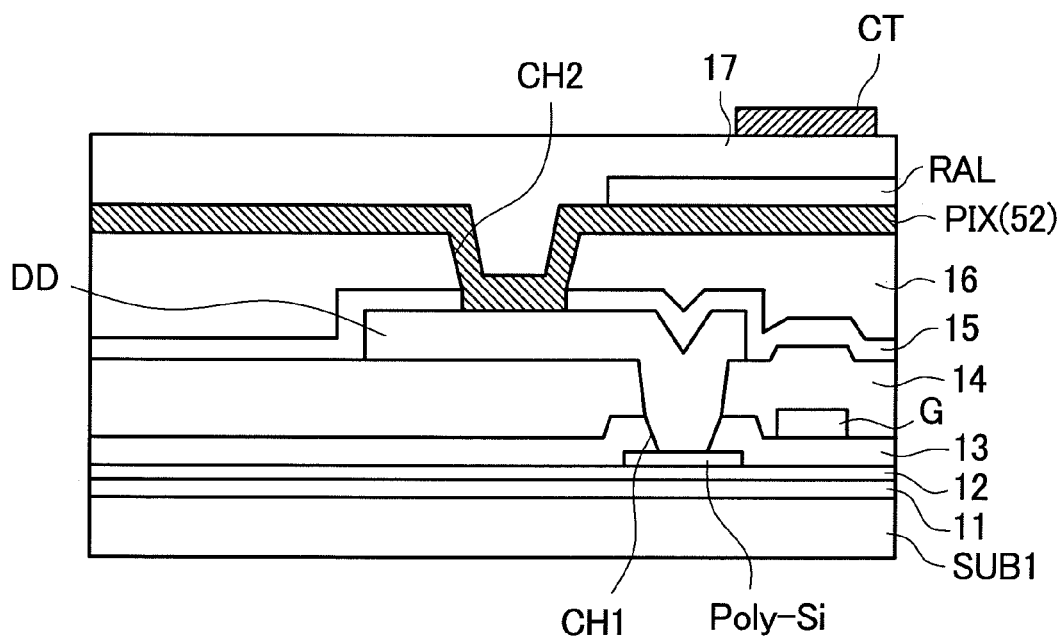
FIG. 18 is a cross-sectional view of main portions, showing the cross-sectional structure along line H-H' of FIG. 16.
Figure 19:
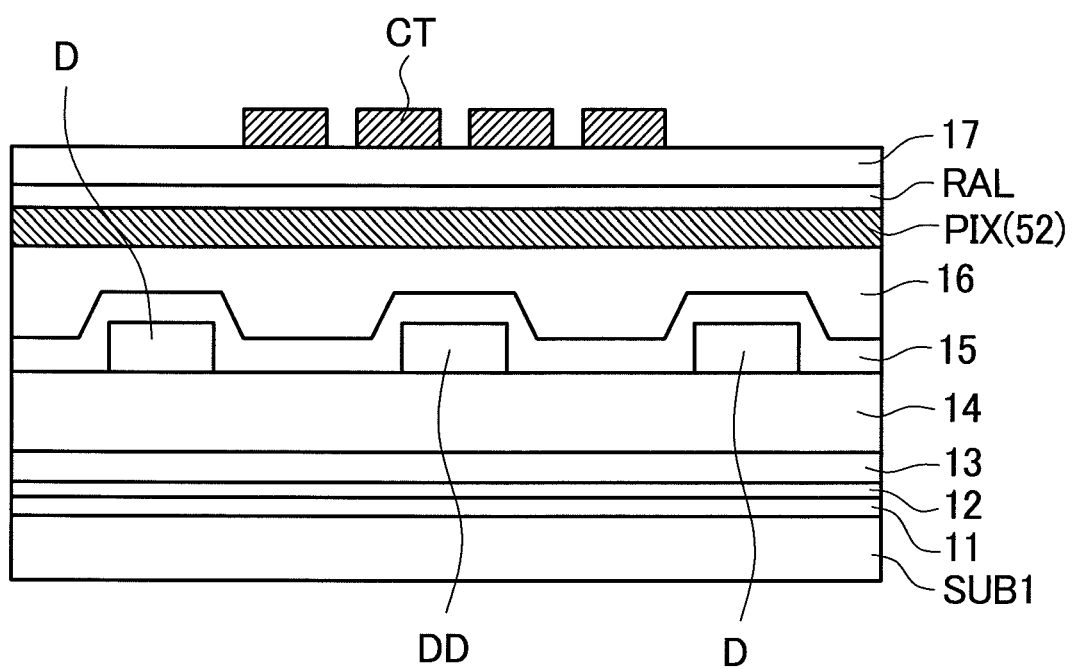
FIG. 19 is a cross-sectional view of main portions, showing the cross-sectional structure along line J-J' of FIG. 16.
Figure 20:
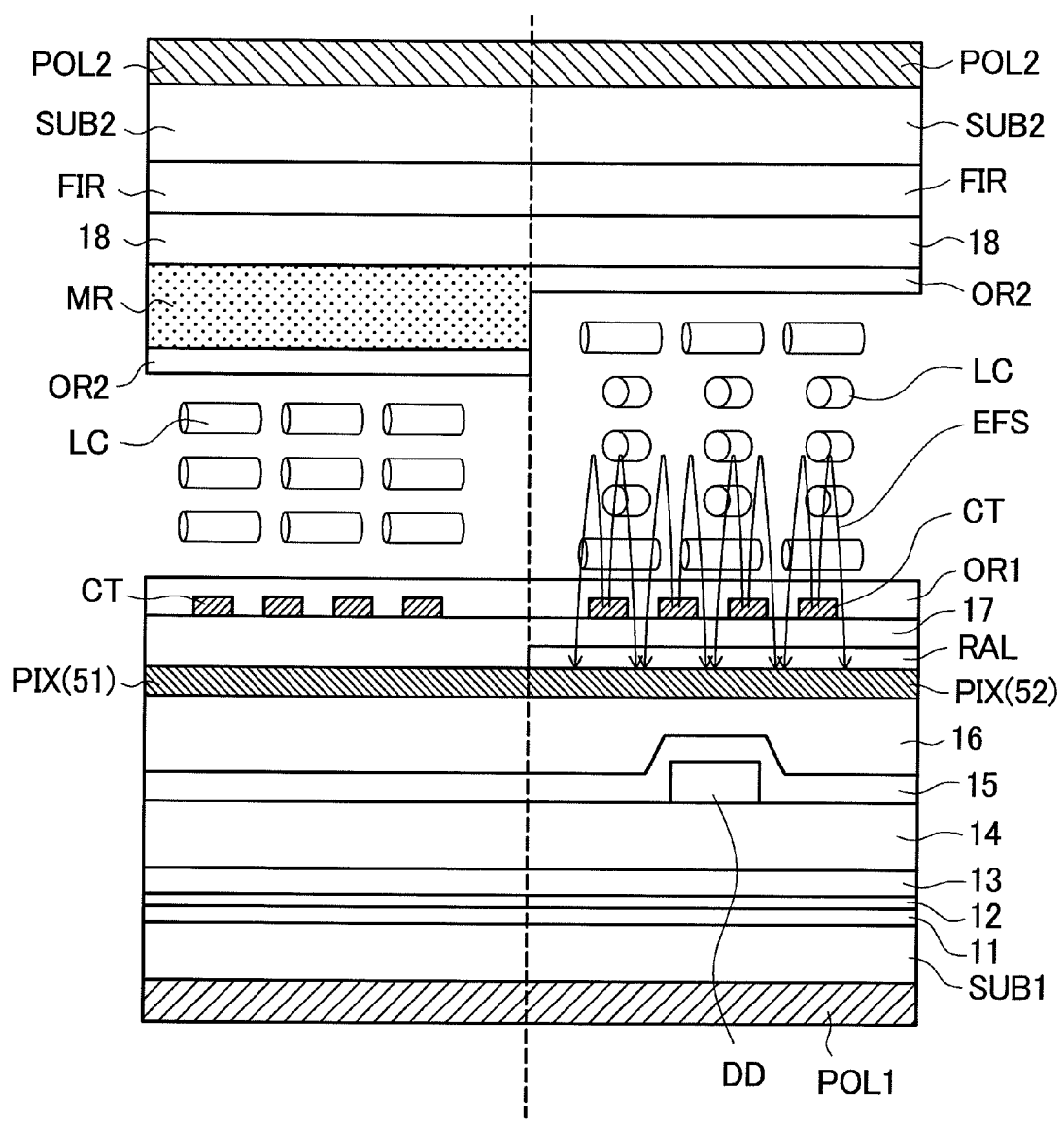
FIGS. 20A and 20B are cross-sectional views of main portions, showing cross-sectional structures along line K-K' and line L-L', respectively, of FIG. 16.
Figure 21:
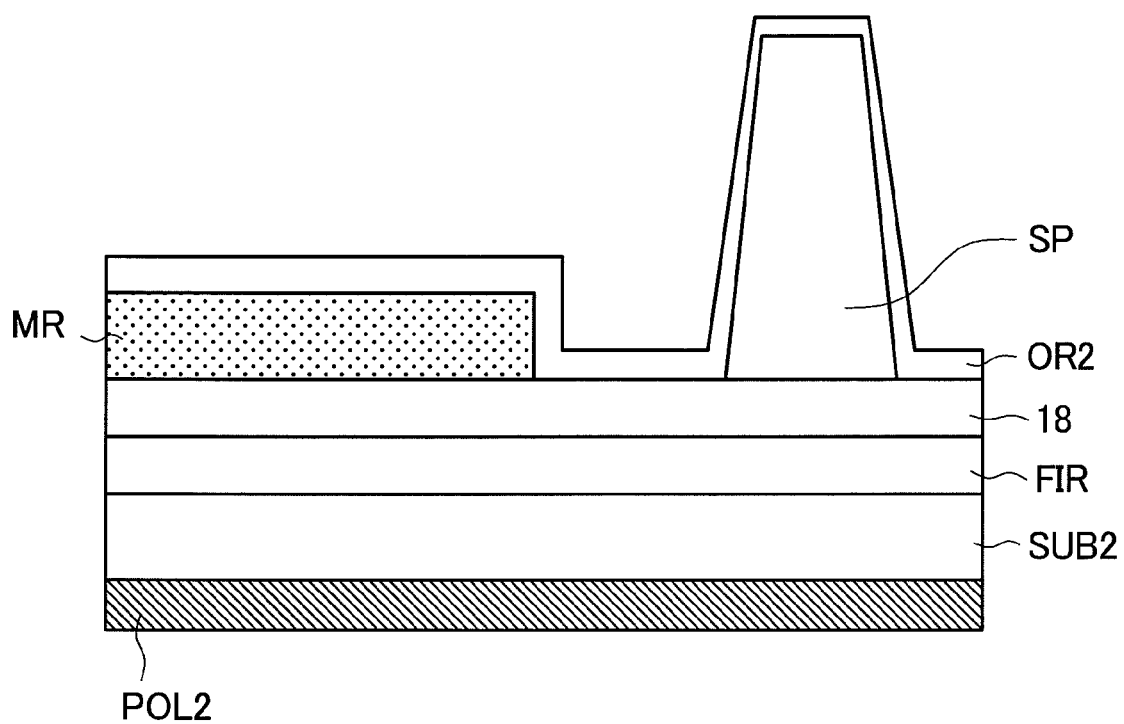
FIG. 21 is a cross-sectional view of a main portion, showing the cross-sectional structure of the post spacer shown in FIG. 16.

FIGS. 16-21 are associated with a transflective liquid crystal display device according to Embodiment 2 of the present invention. FIG. 16 is a plan view showing the electrode structure of one subpixel. FIG. 17 is a cross-sectional view of main portions, showing a cross-sectional structure along line G-G' of FIG. 16. FIG. 18 is a cross-sectional view of main portions, showing a cross-sectional structure along line H-H' of FIG. 16. FIG. 19 is a cross-sectional view of main portions, showing a cross-sectional structure along line J-J' of FIG. 16. FIGS. 20A and 20B are cross-sectional views of main portions, showing cross-sectional structures along line K-K' and line L-L', respectively, of FIG. 16. FIG. 21 is a cross-sectional view of main portions, showing a cross-sectional structure of the post spacer shown in FIG. 16.

The transflective liquid crystal display device according to the present Embodiment 2 is fundamentally identical in structure with the Embodiment 1 described above except for the following points.

In particular, in Embodiment 1, as shown in FIGS. 2-4, the interlayer dielectric film 17 is formed on the planar counter electrode (CT). The pixel electrode (PIX) is formed on the interlayer dielectric film 17. In the present Embodiment 2, as shown in FIGS. 17-19 and 20A-20B, the interlayer dielectric film 17 is formed on the planar pixel electrode (PIX). The counter electrode (CT) is formed on the interlayer dielectric film 17. Therefore, the reflective electrode (RAL) is formed on the pixel electrode (PIX).

In the cross-sectional structure, the pixel electrode (PIX) is located in the lower layer of the counter electrode (CT) and so no contact holes (CH3) are formed.

The manufacturing process is different from the manufacturing process of Embodiment 1 in the following two points.

(1) The process step for forming the counter electrode (CT) and the process step for forming the pixel electrode (PIX) are interchanged in order.

(2) No process step is performed after the application during formation of the interlayer dielectric film 17.

The present Embodiment 2 constructed in this way also makes it possible to improve the contrast ratio of the reflective portion 31 in the same way as in the above Embodiment 1.

In the description of the above Embodiments, the liquid crystal material in the liquid crystal layer (LC) is of the negative type. The present invention is not limited to this type. Obviously, the invention can also be applied to a positive liquid crystal. Generally, a negative liquid crystal has a high viscosity and so the response speed is low. However, there is the advantage that uniform black is obtained in the reflective portion 31 because in-plane uniformity is good. Generally, a positive liquid crystal has a low viscosity and so the response speed is high. In the present invention, the cell gap length of the reflective portion 31 is large and, therefore, the response speed tends to be low. Consequently, where it is desired to increase the response speed, a positive liquid crystal is preferably used.

While the invention made by the present inventors has been described in detail based on the above embodiments, the invention is not limited thereto. Of course, various changes and modifications are possible without departing from the gist of the invention.

What is claimed is:

1. A transflective liquid crystal display device comprising a liquid crystal display panel having a pair of substrates and a liquid crystal layer sandwiched between the substrates, wherein the liquid crystal display panel has plural subpixels each having a transmissive portion and a reflective portion, each of the plural subpixels has a pixel electrode and counter electrodes formed on one of the substrates, the pixel electrode and the counter electrodes produce an electric field to drive the liquid crystal layer, at each of the subpixels, the pixel electrode is shared between the transmissive portion and the reflective portion, at each of the subpixels, the counter electrode of the transmissive portion is independent of the counter electrode of the reflective portion, the counter electrodes for the transmissive portion and the reflective portion are applied with different potentials, the transmissive portion operates in normally black mode and displays black when no voltage is applied, the reflective portion operates in normally white mode and displays white when no voltage is applied, and the liquid crystal layer in the reflective portion is thicker than the liquid crystal layer in the transmissive portion.

2. A transflective liquid crystal display device according to claim 1, wherein a step formation layer is formed in the transmissive portion.

3. A transflective liquid crystal display device according to claim 1, wherein the reflective portion has no retardation film.

4. A transflective liquid crystal display device according to claim 1, wherein the liquid crystal layer is made of a negative liquid crystal.

5. A transflective liquid crystal display device according to claim 1, wherein the liquid crystal layer is made of a positive liquid crystal.

6. A transflective liquid crystal display device according to claim 1, wherein
a first polarizer is disposed on or in one of the substrates and a second polarizer is disposed on or in the other of the substrates,
the first and second polarizers having polarization axes perpendicular to each other, and
a liquid crystal initial orientation axis of the liquid crystal layer is coincident with the polarization axis of one of the first and second polarizers.

7. A transflective liquid crystal display device according to claim 1, wherein at each of the subpixels, a potential applied to the counter electrode of one of the transmissive and reflective portions is higher than a potential applied to the pixel electrode, and wherein a potential applied to the counter electrode of the other of the transmissive and reflective portions is lower than the potential applied to the pixel electrode.

8. A transflective liquid crystal display device according to claim 1, wherein when two adjacent display lines are taken as one display line and the other display line, respectively, the counter electrode of the reflective portion at each of the subpixels on the one display line and the counter electrode of the transmissive portion at each of the subpixels on the other display line are common with each other.

9. A transflective liquid crystal display device according to claim 1, wherein
the counter electrodes are planar electrodes,
an interlayer dielectric film is formed on the planar counter electrodes, and
the pixel electrode is formed on the interlayer dielectric film.

10. A transflective liquid crystal display device according to claim 1, wherein
the pixel electrode is a planar electrode,
an interlayer dielectric film is formed on the planar pixel electrode, and
the counter electrodes are formed on the interlayer dielectric film.

11. A transflective liquid crystal display device according to claim 1, wherein a relationship given by $$1.3 \leq dr/dt \leq 2$$

is satisfied, where dr is the thickness of the liquid crystal layer in the reflective portion and dt is the thickness of the liquid crystal layer in the transmissive portion.

12. A transflective liquid crystal display device according to claim 11, wherein a relationship given by $$1.5 \leq dr/dt \leq 1.6$$

is satisfied, where dr is the thickness of the liquid crystal layer in the reflective portion and dt is the thickness of the liquid crystal layer in the transmissive portion.

* * * * *